(12) United States Patent
Lee et al.

(10) Patent No.: US 12,506,965 B2
(45) Date of Patent: Dec. 23, 2025

(54) ACTUATOR FOR OPTICAL IMAGE STABILIZATION HAVING A BASE WITH MULTIPLE MATERIALS AND CAMERA MODULE INCLUDING THE SAME

(71) Applicant: SAMSUNG ELECTRO-MECHANICS CO., LTD., Suwon-si (KR)

(72) Inventors: Kyung Hun Lee, Suwon-si (KR); Jong Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 62 days.

(21) Appl. No.: 18/451,291

(22) Filed: Aug. 17, 2023

(65) Prior Publication Data

US 2024/0223899 A1 Jul. 4, 2024

(30) Foreign Application Priority Data

Jan. 3, 2023 (KR) .................. 10-2023-0000846

(51) Int. Cl.
*H04N 23/68* (2023.01)
*H04N 23/52* (2023.01)

(52) U.S. Cl.
CPC .......... *H04N 23/687* (2023.01); *H04N 23/52* (2023.01)

(58) Field of Classification Search
CPC ...... H04N 23/687; H04N 23/52; H04N 23/54; H04N 23/55; H04N 23/57; H04N 23/68; G03B 5/06; G03B 17/12; G03B 2205/0015; G03B 2205/0069
See application file for complete search history.

(56) References Cited

U.S. PATENT DOCUMENTS

| 8,818,181 B1 | 8/2014 | Hwang et al. |
| 11,057,564 B2 | 7/2021 | Johnson et al. |
| 11,058,018 B1* | 7/2021 | Yoon ..................... G06F 1/1643 |
| 2019/0285782 A1* | 9/2019 | Hsu ....................... H04N 23/55 |
| 2020/0314338 A1* | 10/2020 | Johnson ................. H04N 23/68 |

(Continued)

FOREIGN PATENT DOCUMENTS

| EP | 4 044 774 A1 | 8/2022 |
| JP | 2022-517200 A | 3/2022 |

(Continued)

OTHER PUBLICATIONS

Korean Office Action issued on Aug. 18, 2025 in counterpart Korean Patent Application No. 10-2023-0000846(7 pages in English, 5 pages in Korean).

*Primary Examiner* — Padma Haliyur
(74) *Attorney, Agent, or Firm* — NSIP Law

(57) ABSTRACT

An actuator for optical image stabilization includes: a fixed frame defining an internal space; a movable frame accommodated in the fixed frame and movable relative to the fixed frame; a first driver to provide driving force to the movable frame; a sensor substrate including a moving portion coupled to the movable frame and movable with the movable frame; an image sensor disposed in the sensor substrate and including an imaging surface oriented toward a first direction; and a base spaced apart from the image sensor. The base includes a first plate facing the image sensor and a second plate surrounding an external periphery of the first plate, and the first plate and the second plate are formed of different materials.

16 Claims, 19 Drawing Sheets

(56) References Cited

U.S. PATENT DOCUMENTS

| | | | |
|---|---|---|---|
| 2022/0014677 A1* | 1/2022 | Smyth | G02B 7/09 |
| 2022/0086317 A1 | 3/2022 | Paik et al. | |
| 2022/0353416 A1* | 11/2022 | Kwon | G02B 7/09 |
| 2024/0267637 A1* | 8/2024 | Lee | G06F 1/1637 |
| 2024/0340509 A1* | 10/2024 | Park | H04N 23/54 |
| 2024/0377611 A1* | 11/2024 | Liu | G03B 30/00 |
| 2024/0406528 A1* | 12/2024 | Peng | H04N 23/55 |

FOREIGN PATENT DOCUMENTS

| | | | | |
|---|---|---|---|---|
| KR | 10-2015-0020950 A | 2/2015 | | |
| KR | 10-2019-0054550 A | 5/2019 | | |
| KR | 10-2021-0043244 A | 4/2021 | | |
| WO | WO-2021162276 A1 * | 8/2021 | | G06F 1/1626 |
| WO | WO-2023151645 A1 * | 8/2023 | | G03B 13/34 |

* cited by examiner

ACTUATOR FOR OPTICAL IMAGE STABILIZATION HAVING A BASE WITH MULTIPLE MATERIALS AND CAMERA MODULE INCLUDING THE SAME

CROSS-REFERENCE TO RELATED APPLICATION(S)

This application claims the benefit under 35 USC 119(a) of Korean Patent Application No. 10-2023-0000846 filed on Jan. 3, 2023, in the Korean Intellectual Property Office, the entire disclosure of which is incorporated herein by reference for all purposes.

BACKGROUND

The following description relates to an actuator for optical image stabilization and a camera module including the same.

Camera modules have been adopted in mobile communication terminals such as smartphones, tablet PCs, and laptops. Accordingly, demand for the function of a camera adopted in the mobile device has been also gradually increasing. For example, although the camera adopted in the mobile device has a small size, it has been made to provide advanced capturing functions (e.g., an automatic focus function, an optical image stabilization function, etc.) implemented in a conventional DSLR camera.

An optical image stabilization function, that is, a handshake correction function, is largely divided into digital IS (DIS), electronic IS (EIS), and optical IS (OIS), and the optical IS (OIS) thereamong fundamentally blocks image degradation due to shaking by modifying an optical path by moving a lens or an image sensor in a direction perpendicular to an optical axis. Since a mechanical driving device is required for these functions, the implementation of the device is complicated and expensive, which shows excellent correction performance.

Among operating methods of the OIS, a method of moving an image sensor (e.g., Sensor-Shift) requires relatively less force than a method of moving a lens. Since the image sensor is relatively light, it may be advantageous to implement an excellent anti-shaking function with little force.

Since the method of moving an image sensor (Sensor-Shift) needs to be formed to enable movements of the image sensor and a printed circuit board (PCB) connected to the image sensor, the image sensor is spaced apart from a set component that accommodates a camera module. Accordingly, heat generated by the image sensor and the PCB connected to the image sensor is radiated through convection or radiation. The convection or the radiation of the heat is slower than conduction, and accordingly, the heat of the image sensor may not be smoothly radiated. When the heat is not smoothly radiated, image distortion or a sensor off defect due to self-heating of the image sensor may occur.

Furthermore, in order to move the image sensor, an impact may occur between components of various camera modules. Since various camera components may fall off due to the impact between the components, a shape and a structure to compensate therefor may be required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for optical image stabilization includes: a fixed frame defining an internal space; a movable frame accommodated in the fixed frame and configured to be movable relative to the fixed frame; a first driver configured to provide driving force to the movable frame; a sensor substrate including a moving portion coupled to the movable frame, wherein the moving portion is configured to move with the movable frame; an image sensor disposed in the sensor substrate and including an imaging surface oriented toward a first direction; and a base spaced apart from the image sensor. The base includes a first plate facing the image sensor and a second plate surrounding an external periphery of the first plate, and the first plate and the second plate are formed of different materials.

The first plate may be formed of a material having a higher thermal conductivity than a thermal conductivity of the second plate.

The first plate may be formed of stainless steel.

The first plate may be insert-injected from the base.

The actuator for optical image stabilization may include a heat transmission member disposed between the image sensor and the base.

The first plate and the heat transmission member may be spaced apart from each other.

The image sensor may be disposed on the moving portion of the sensor substrate and the sensor substrate may further include: a fixed portion coupled to the fixed frame; and a connection portion connecting the moving portion to the fixing portion. The connection portion may extend along a circumference of the moving portion and may include a plurality of bridge elements spaced apart from each other.

The connection portion may include a first support and a second support, a first side of the first support may be connected to the fixing portion and a second side of the first support may be spaced apart from the moving portion, and a first side of the second support may be connected to the moving portion and a second side of the second support may be spaced apart from the fixing portion.

The second plate may include an indented avoidance groove indented, and the avoidance groove may be disposed to correspond to the second support.

The actuator for optical image stabilization may include a heat dissipation film disposed on a lower portion of the base.

The heat dissipation film may cover a lower surface of the base and a side surface of the fixed frame.

The heat dissipation film may be formed of a graphite material.

The actuator for optical image stabilization may include a buffer member disposed on a side surface of the movable frame or on an internal side surface of the fixed frame facing a side surface of the movable frame and configured to absorb impacts generated when the movable frame moves relative to the fixed frame.

In another general aspect, a camera module includes: a housing defining an internal space; a lens module accommodated in the internal space and configured to be movable in an optical axis direction; a fixed frame fixed to the housing; a movable frame accommodated in the fixed frame and configured to be movable relative to the fixed frame; a first driver configured to provide driving force to the movable frame; a sensor substrate including a moving portion coupled to the movable frame, wherein the moving portion is configured to move with the movable frame; an image sensor disposed on the sensor substrate and including an imaging surface oriented toward a first direction; and a base spaced apart from the image sensor. The base includes a first plate formed of a material having a higher thermal conductivity than a thermal conductivity of the base.

The first driver may include a first sub driver configured to generate driving force in a first axis direction perpendicular to the optical axis direction, and a second sub driver configured to generate driving force in a second axis direction perpendicular to both the optical axis direction and the first axis direction, and at least one of the first sub driver and the second sub driver may include a plurality of magnets spaced apart from each other in a direction perpendicular to a direction in which the driving force is generated.

The camera module may include a second driver configured to provide driving force to move the lens module relative to the housing in the optical axis direction, and the second driver may include a magnet disposed in the lens module and a coil disposed on the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
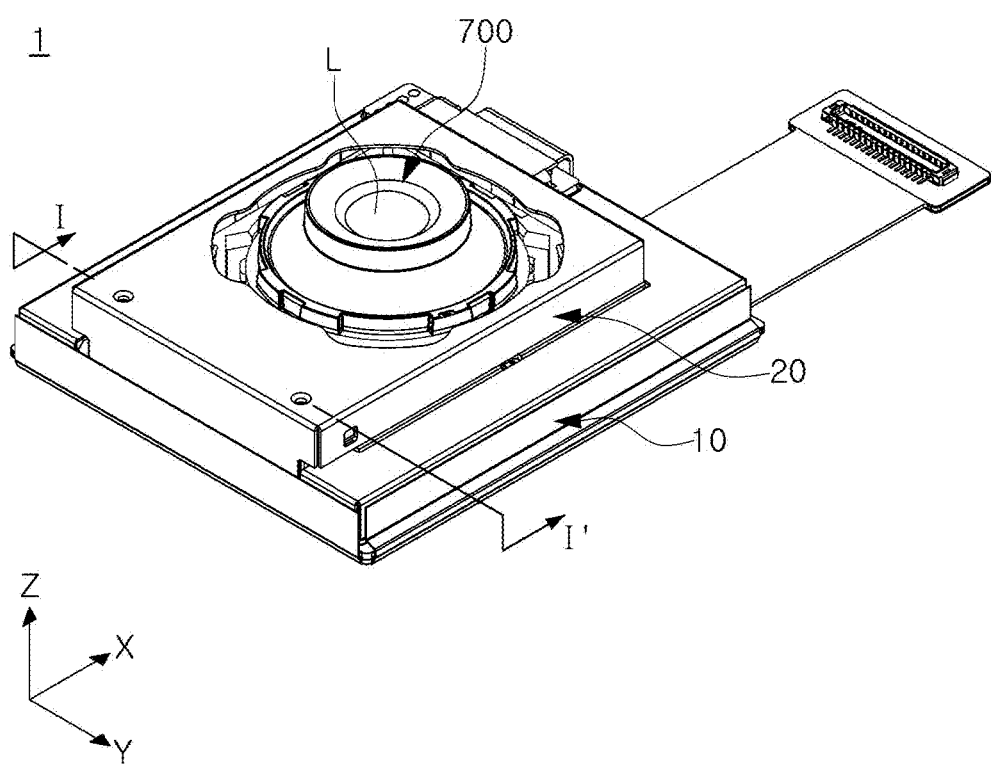
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Furthermore, in the specification, an X-direction, a Y-direction, and a Z-direction refer to a direction parallel to an X-axis, a direction parallel to a Y-axis, and a direction parallel to a Z-axis, respectively. Furthermore, unless otherwise described, the X-direction is a concept including both a +X-axis direction and a −X-axis direction, which is equally applied to the Y-direction and the Z-direction.

Furthermore, the fact that two directions (or axes) are parallel or perpendicular to each other in the specification includes a case in which the two directions (or axes) are generally parallel to each other. For example, a first axis and a second axis being perpendicular to each other denotes that the first axis and the second axis form an angle of 90 degrees or close to 90 degrees.

Figure 2:
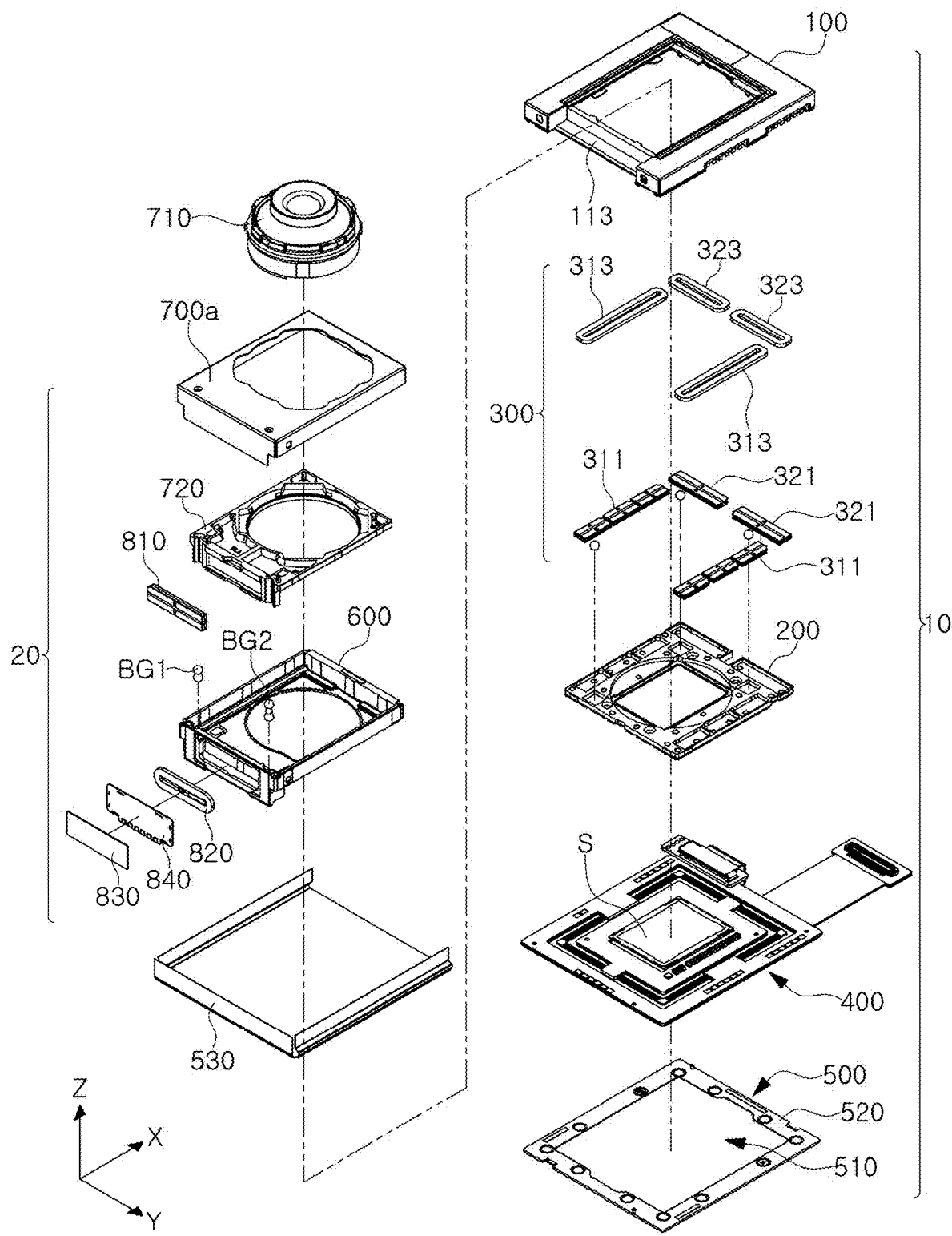
FIG. 2 is a schematic exploded perspective view of a camera module according to an example.

FIG. 1 is a perspective view of a camera module 1 according to an example, and FIG. 2 is a schematic exploded perspective view of the camera module 1.

An actuator for optical image stabilization and a camera module including the same may be mounted in a portable electronic device. The portable electronic device may be an electronic device such as a mobile communication terminal, a smartphone, a tablet PC, or the like. Referring to FIGS. 1 and 2, the camera module 1 includes a lens module 700, a first actuator 10, and a second actuator 20.

The lens module 700 includes at least one lens L and a lens barrel 710. The at least one lens L is disposed inside the lens barrel 710. When a plurality of lenses L are provided, the plurality of lenses L are mounted inside the lens barrel 710 in an optical axis (Z-axis) direction.

The lens module 700 may further include a carrier 720 coupled to the lens barrel 710. The carrier 720 may be equipped with a hollow portion penetrating through the carrier 720 in the optical axis (Z-axis) direction, and the lens barrel 710 is inserted into the hollow portion and fixed to the carrier 720.

The lens module 700 is a member configured to move in the optical axis (Z-axis) direction during automatic focus (AF) or a fixing member configured not to move during optical image stabilization (OIS). When performing the optical image stabilization (OIS), the camera module 1 may perform the optical image stabilization (OIS) by moving an image sensor S instead of the lens module 700. To this end, the camera module 1 includes the first actuator 10 for performing the optical image stabilization and the second actuator 20 for performing the automatic focus.

The first actuator 10 is an actuator for optical image stabilization. The first actuator 10 includes a fixed frame 100, a movable frame 200, a first driver 300, a sensor substrate 400, and a base 500. By the first actuator 10, the image sensor S may move in a direction perpendicular to a direction in which an imaging surface of the image sensor S faces. For example, by the first actuator 10, the image sensor S may move in a direction perpendicular to the optical axis (Z-axis) or rotate with the optical axis (Z-axis) as a rotation axis, thus correcting shaking, that is, performing optical image stabilization. For convenience of explanation, the image sensor S has been described as rotating with the optical axis (Z-axis) as the rotation axis. However, when the image sensor S rotates, a rotation axis thereof may not match the optical axis (Z-axis). For example, the image sensor S may rotate with any one axis parallel to a direction in which the imaging surface of the image sensor S faces, as a rotation axis.

The second actuator 20 is an actuator for adjusting a focus. The second actuator 20 includes a housing 600 and a second driver 800, and also includes a case 700a (also see FIG. 17). The lens barrel 710 and the carrier 720 in which the lens barrel 710 is fixed may be moved by the second actuator 20 in the optical axis (Z-axis) direction with respect to the housing 600. A detailed operating method of the first actuator 10 and the second actuator 20 will be described below.

Figure 3:
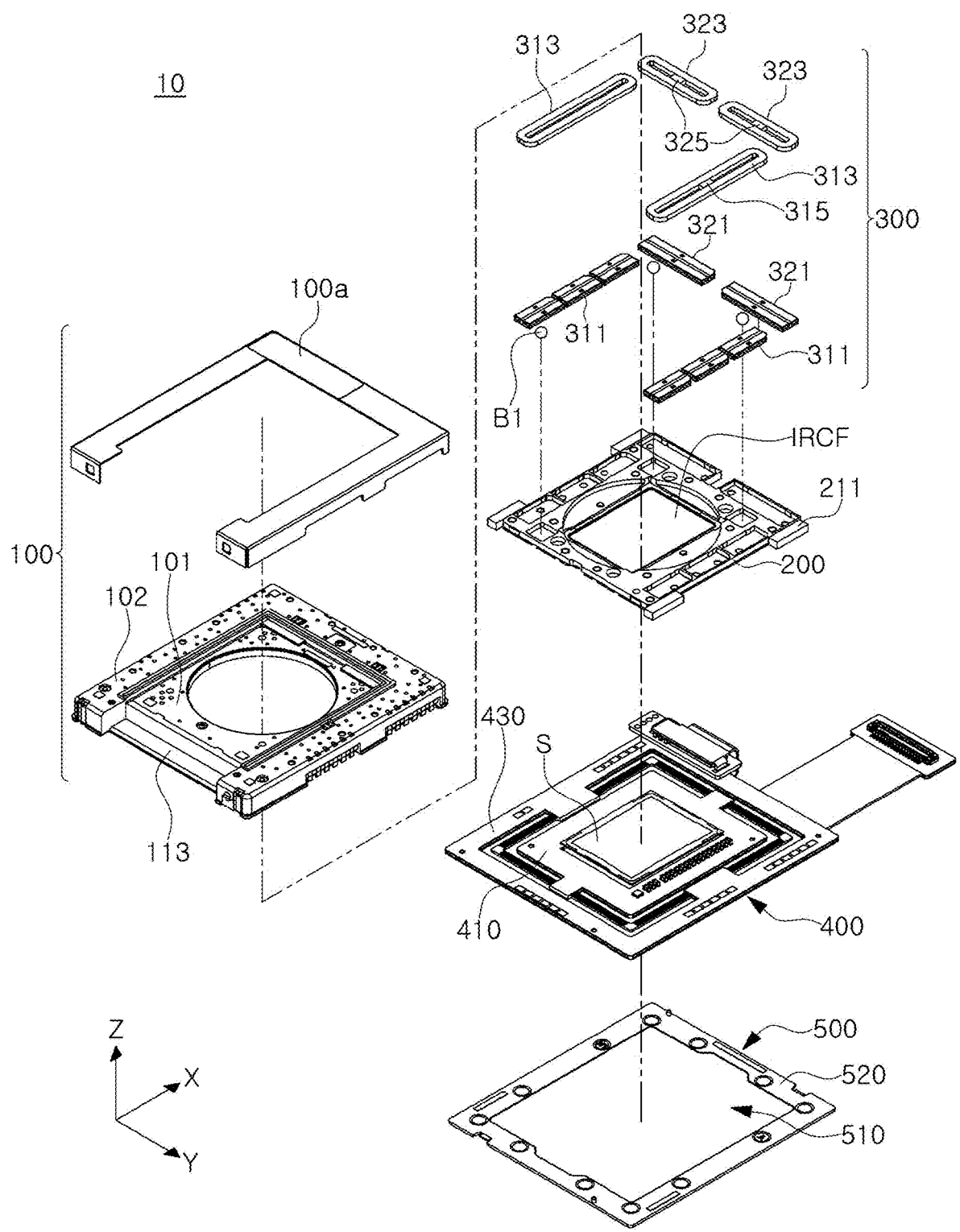
FIG. 3 is an exploded perspective view of the first actuator.

FIG. 3 is an exploded perspective view of the first actuator 10.

Referring to FIG. 3, the first actuator 10 includes a fixed frame 100, a movable frame 200, a first driver 300, a sensor substrate 400, and a base 500.

The fixed frame 100 is a fixing member that does not move during focus adjustment and optical image stabilization. The fixed frame 100 may be coupled to the second actuator 20. For example, the fixed frame 100 may be coupled to the housing 600 of the second actuator 20.

The fixed frame 100 may have a square plate shape in which a center thereof penetrates through in the optical axis (Z-axis) direction. The fixed frame 100 may include a shield can 100a, and a first frame 101 and a second frame 102. The fixed frame 100, including a wiring pattern 110, a support pad 120 and a yoke unit 130, has a sidewall extending downwardly in the optical axis (Z-axis) direction, and accordingly, the fixed frame 100 may have an accommodation space for accommodating the movable frame 200.

The movable frame 200 is a moving member that moves during the optical image stabilization. The movable frame 200 may relatively move with respect to the fixed frame 100 in the direction perpendicular to the optical axis (Z-axis) or may rotate with the optical axis (Z-axis) as a rotation axis. For example, the movable frame 200 may be configured to be movable in a first axis (X-axis) and a second axis (Y-axis), and may be rotated with the optical axis (Z-axis) as a rotation axis. The first axis (X-axis) direction may refer to the direction perpendicular to the optical axis (Z-axis), and the second axis (Y-axis) direction may refer to a direction perpendicular to both the optical axis (Z-axis) direction and the first axis (X-axis) direction.

The movable frame 200 may have a rectangular plate shape in which a center thereof is penetrated in the optical axis (Z-axis) direction. An infrared blocking filter IRCF may be mounted on an upper surface of the movable frame 200. The sensor substrate 400 may be mounted on a lower surface of the movable frame 200.

The first driver 300 includes a plurality of coils 313 and 323 and a plurality of magnets 311 and 321. The plurality of coils 313 and 323 may be disposed on a lower surface of the fixed frame 100, and the plurality of magnets 311 and 321 may be disposed on the upper surface of the movable frame 200. In the instant case, an accommodation space configured to accommodate the plurality of magnets 311 and 321 may be provided on the upper surface of the movable frame 200.

A plurality of buffer members 211 may be disposed on an external surface of the movable frame 200. The plurality of buffer members 211 will be described below.

A first ball member B1 may be disposed between the fixed frame 100 and the movable frame 200. The first ball member B1 may be disposed to come into contact with the fixed frame 100 and the movable frame 200, respectively. When the movable frame 200 relatively moves or rotates with respect to the fixed frame 100, the first ball member B1 supports the movement of the movable frame 200 by rolling between the fixed frame 100 and the movable frame 200.

At least one of the surfaces in which the fixed frame 100 and the movable frame 200 face each other in the optical axis (Z-axis) direction is equipped with a guide groove in which the first ball member B1 is disposed. A plurality of guide grooves are provided to correspond to a plurality of balls of the first ball member B1.

The image sensor S is mounted in the sensor substrate 400. A portion of the sensor substrate 400 is coupled to the movable frame 200, and the other portion of the sensor substrate 400 is coupled to the fixed frame 100. For example, a moving portion 410 of the sensor substrate 400 is coupled to the movable frame 200, and a fixing portion 430 of the sensor substrate 400 is coupled to the fixed frame 100. The image sensor S is mounted in a portion of the sensor substrate 400 coupled to the movable frame 200. Because a portion of the sensor substrate 400 is coupled to the movable frame 200, a portion of the sensor substrate 400 may also move or rotate with the movable frame 200 with the movement or the rotation of the movable frame 200. Accordingly, the image sensor S may move or rotate on a plane perpendicular to the optical axis (Z-axis), thereby performing the optical image stabilization shaking during capturing.

The base 500 may be coupled to a lower portion of the sensor substrate 400. The base 500 may be coupled to the sensor substrate 400 to cover the lower portion of the sensor substrate 400. The base 500 may serve to prevent external foreign materials from entering through a gap between the moving portion 410 and the fixing portion 430 of the sensor substrate 400.

The base 500 may include a first plate 510 and a second plate 520 surrounding the first plate 510. A heat dissipation film 530 may be disposed on a lower portion of the base 500. A detailed description thereof will be described below.

Figure 4:
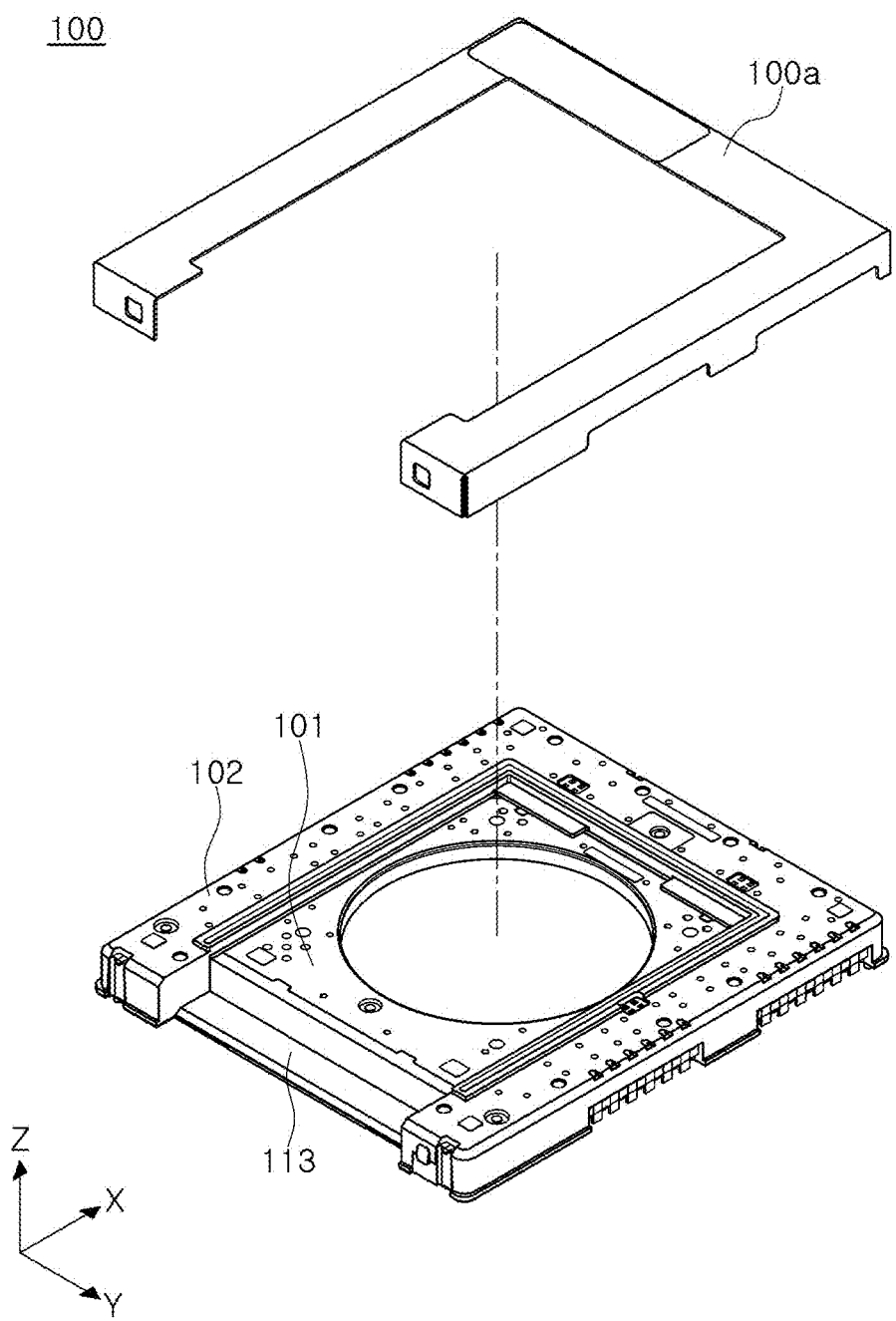
FIG. 4 is a schematic exploded perspective view of a fixed frame of a first actuator.
Figure 5:
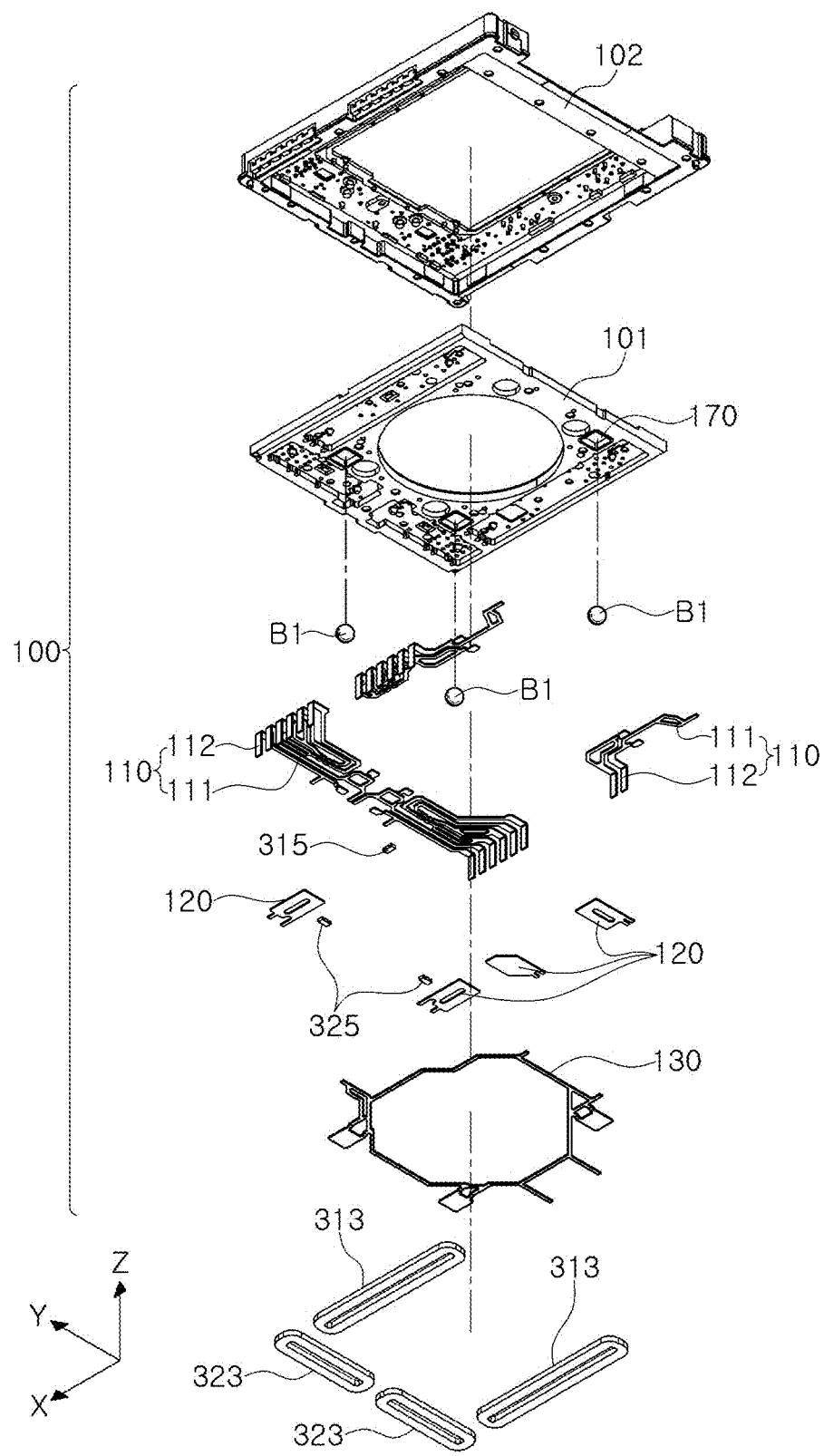
FIG. 5 is an exploded bottom perspective view of a fixed frame of a first actuator.
Figure 6:
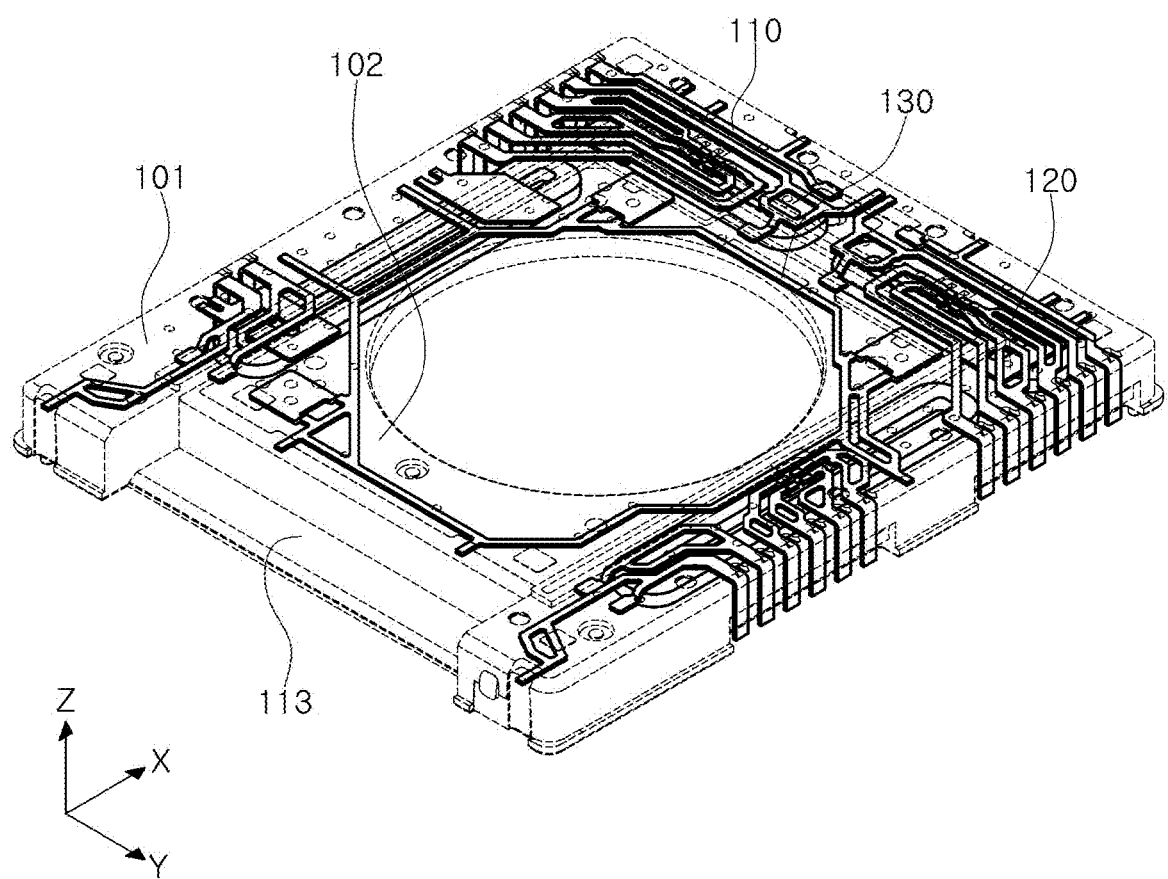
FIG. 6 is a perspective view illustrating a wiring pattern, a support pad, and a yoke unit disposed in the fixed frame of the first actuator.
Figure 7:
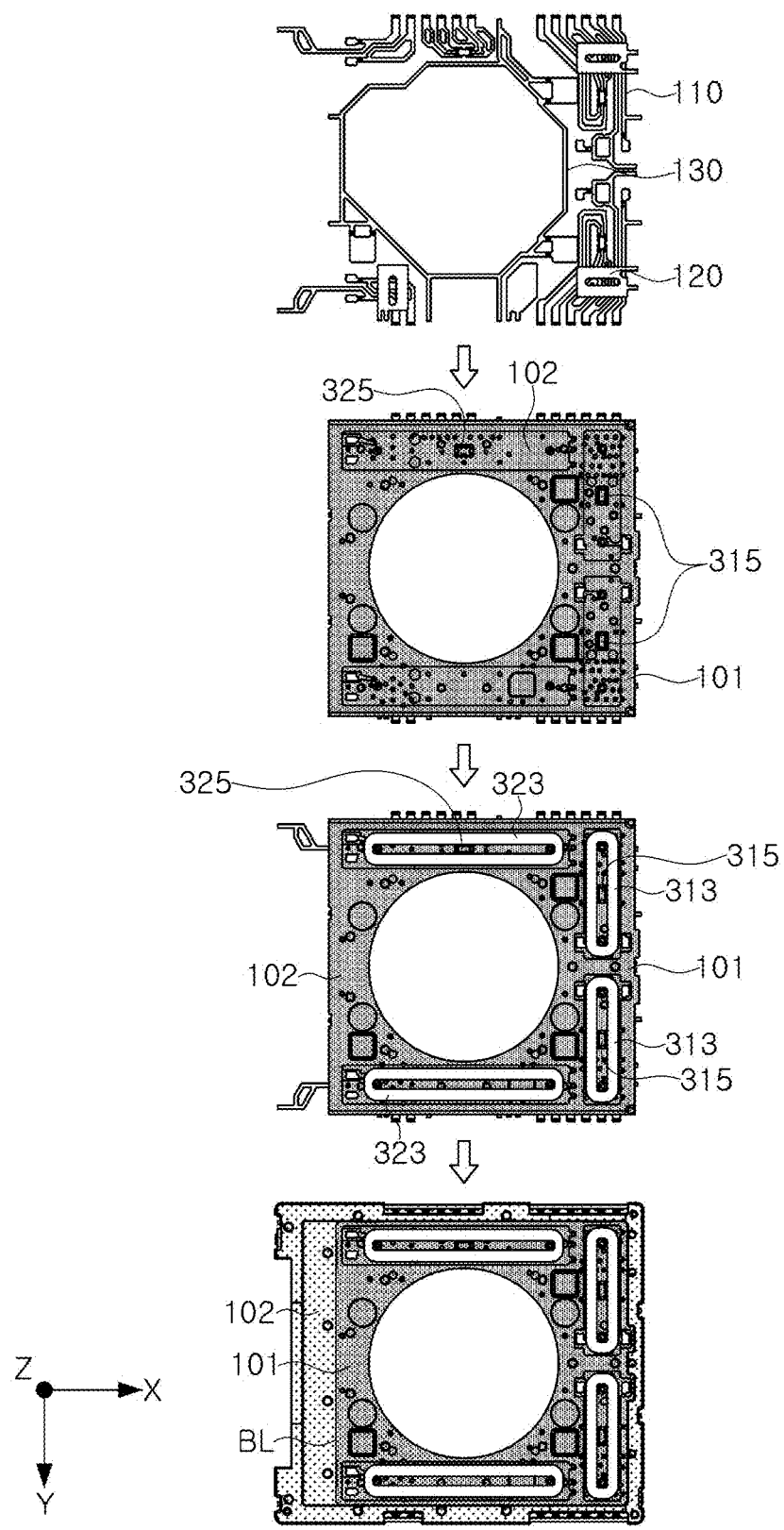
FIG. 7 is a view illustrating a process of manufacturing the fixed frame of the first actuator.
Figure 8:
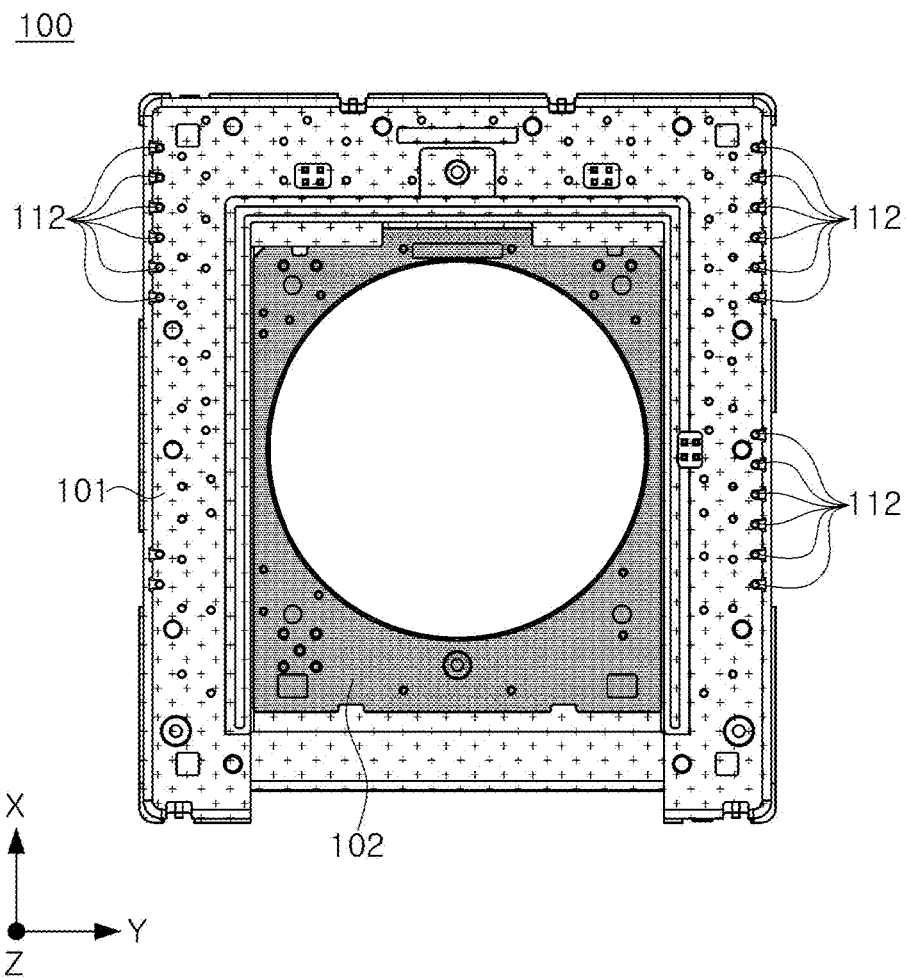
FIG. 8 is a plan view illustrating a structure before a shield can is coupled to the fixed frame of the first actuator.

FIG. 4 is a schematic exploded perspective view of the fixed frame 100 of the first actuator 10, and FIG. 5 is an exploded bottom perspective view of the fixed frame 100 of a first actuator 10. FIG. 6 is a perspective view illustrating the wiring pattern 110, the support pad 120, and the yoke unit 130 disposed in the fixed frame 100 of the first actuator 10. FIG. 7 is a view illustrating a process of manufacturing the fixed frame 100 of the first actuator 10. FIG. 8 is a plan view illustrating a structure before a shield can 100a is coupled to the fixed frame 100 of the first actuator 10.

FIG. 4 is a schematic disassembly perspective view of the fixed frame 100 of the first actuator 10, and FIG. 5 is a disassembly bottom perspective view of the fixed frame 100 of the first actuator 10. FIG. 6 is a perspective view for explaining the wiring pattern 110, the support pad 120, and the yoke unit 130 disposed inside the fixed frame 100 of the first actuator 10. FIG. 7 is a view illustrating a process of manufacturing the fixed frame 100 of the first actuator 10. FIG. 8 is a plan view illustrating a structure before the shield can 100a is coupled to the fixed frame 100 of the first actuator 10. With reference to FIGS. 4 to 8, a configuration of the fixed frame 100 will be described.

Referring to FIG. 4, the fixed frame 100 may further include the shield can 100a. After performing secondary injection in a manufacturing process of the fixed frame 100 described below, the shield can 100a may be coupled to cover at least a portion of an upper surface and a side surface of the second frame 102 as a secondary injection molded product. The shield can 100a may serve to shield electromagnetic waves.

Referring to FIGS. 4 and 5, the fixed frame 100 has the wiring pattern 110 therein, and the wiring pattern 110 may be connected to a first coil 313 and a second coil 323. Furthermore, the wiring pattern 110 of the fixed frame 100 may be connected to the sensor substrate 400. Accordingly, the first coil 313 and the second coil 323 may receive power through the wiring pattern 110 disposed in the fixed frame 100.

In other words, the camera module 1 does not have a separate printed circuit board for supplying power to the first driver 300, and is configured to supply the power to the first driver 300 by having the wiring pattern 110 in the fixed frame 100 itself.

Referring to FIGS. 6 and 7, the wiring pattern 110 may be integrally coupled to the fixed frame 100 by insert injection. For example, the wiring pattern 110 may be manufactured to be integrated with the fixed frame 100 by injecting a resin material into a mold in a state in which the wiring pattern 110 is disposed in the mold.

Referring to FIG. 7, the camera module 1 may be subject to at least two injections in the process of manufacturing the fixed frame 100. The wiring pattern 110 may minimize a pattern width thereof to reduce a size, and in the instant case, it may be difficult to fix a position of the wiring pattern 110 during the insert injection due to insufficient rigidity of the wiring pattern 110. Accordingly, a primary injection molded product (e.g., the first frame 101) integrated with the wiring pattern 110 may be manufactured by the insert injection, and then, the primary injection molded product may be insert-injected to manufacture a secondary injection molded product (e.g., the second frame 102) integrated with the primary injection molded product, thus manufacturing the fixed frame 100 having the wiring pattern 110. Because the camera module 1 is subject to the at least two injections, a boundary line BL is formed between the first frame 101 as the primary injection molded product and the second frame 102 as the secondary injection molded product.

A first coil 313, a second coil 323, a first position sensor 315, and a second position sensor 325 are disposed in the first frame 101 which is the primary injection molded product. The first coil 313, the second coil 323, the first position sensor 315, and the second position sensor 325 are connected to the wiring pattern 110 provided in the first frame 101.

In an example of FIG. 7, after the primary injection, the first position sensor and the second position sensor, and the first coil and the second coil are disposed in the first frame, and then, the secondary injection is performed. However, the configuration is not limited thereto, and the first coil and the second coil may be disposed in the first frame after the secondary injection. Furthermore, the first position sensor and the second position sensor may also be disposed in the first frame after the secondary injection.

Referring to FIGS. 5, 6 and 8, the wiring pattern 110 includes a wiring portion 111 and a terminal portion 112, the wiring portion 111 is disposed inside the first frame 101, and the terminal portion 112 is disposed to be exposed outside the first frame 101. Furthermore, the terminal portion 112 is disposed to be exposed outside the second frame 102. As the terminal portion 112 of the wiring pattern 110 is connected to the sensor substrate 400, power may be applied to the first coil 313 and the second coil 323 through the wiring pattern 110.

Referring to FIG. 5, a first guide groove 170 in which the first ball member B1 is disposed is formed in the first frame 101. Because the first ball member B1 may be formed of a ceramic material and the first frame 101 is formed of a plastic material, there may be a risk that the first guide groove 170 may be damaged due to a difference in rigidity.

Accordingly, the support pad 120 is disposed on a bottom surface of the first guide groove 170 in order to prevent the damage to the first guide groove 170, and the support pad 120 may be insert-injected as in the wiring pattern 110 during the primary injection and may be integrated with the first frame 101. The support pad 120 may be formed of stainless steel.

A portion of the support pad 120 may be disposed inside the first frame 101, and the other part of the support pad 120 may be disposed to be exposed to outside the first frame 101. The support pad 120 exposed outside the first frame 101 may form the bottom surface of the first guide groove 170. Accordingly, the first ball member B1 may be rolled in contact with the support pad 120.

Referring to FIGS. 5 and 6, the yoke unit 130 is disposed inside the fixed frame 100. The yoke unit 130 provides attractive force so that the fixed frame 100 and the movable frame 200 may maintain contact with the first ball member B1. The yoke unit 130 may be formed of a material capable of generating the attractive force between the first magnet 311 and the second magnet 321. For example, the yoke unit 130 may be provided as a magnetic material.

The yoke unit 130 may be insert-injected as in the wiring pattern 110 during the primary injection and may be integrated with the first frame 101. The yoke unit 130 is disposed to face the first magnet 311 and the second magnet 321 in the optical axis (Z-axis) direction. The yoke unit 130 includes a plurality of yokes. For example, the yoke unit 130 may include two yokes facing two magnets included in the second magnet 321 and two yokes facing two magnets included in the first magnet 311.

The number of yokes 130 is not particularly limited, but a center point of action of the attractive force exerted between the first magnet 311 and the second magnet 321, and the yoke unit 130 has to be disposed in a support region in which the plurality of balls included in the first ball member B1 are connected to each other.

The attractive force is exerted between the yoke unit 130 and the first magnet 311, and between the yoke unit 130 and the second magnet 321, respectively, in the optical axis (Z-axis) direction. Accordingly, because the movable frame 200 is pressed in a direction toward the fixed frame 100, the fixed frame 100 and the movable frame 200 may maintain contact with the first ball member B1.

Figure 9:
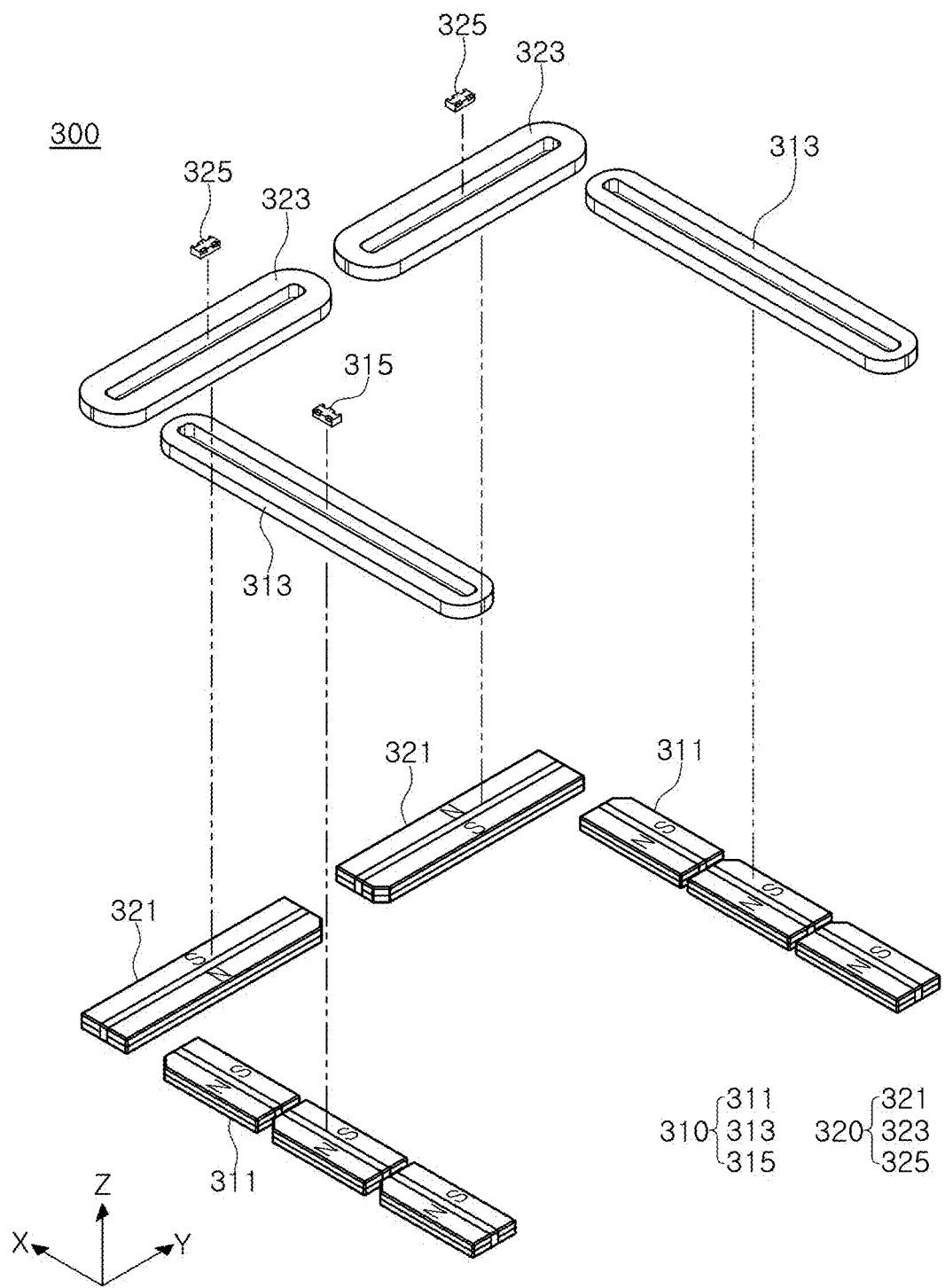
FIG. 9 is an exploded perspective view of a first driver of the first actuator.

FIG. 9 is an exploded perspective view of the first driver 300 of the first actuator 100.

Referring to FIG. 9, the first driver 300 may generate driving force in the direction perpendicular to the optical axis (Z-axis) so that the movable frame 200 may move in the direction perpendicular to the optical axis (Z-axis) or rotate with the optical axis (Z-axis) as a rotation axis.

The first driver 300 includes a first sub driver 310 and a second sub driver 320. The first sub driver 310 may generate the driving force in the first axis (X-axis) direction, and the second sub driver 320 may generate the driving force in the second axis (Y-axis) direction.

The first sub driver 310 includes the first magnet 311 and the first coil 313. The first magnet 311 and the first coil 313 may be disposed to face each other in the optical axis (Z-axis) direction.

The first magnet 311 may include a plurality of magnets. For example, the first magnet 311 may include two sets of magnets spaced apart from each other in a direction (a first axis (X-axis) in which the driving force is generated by the first magnet 311. At least two magnets may be included for each set. The magnets included in each set may be spaced apart from each other in the second axis (Y-axis) direction. In the instant case, one magnet with a long shape in the second axis (Y-axis) may be used, but if the magnet is too elongated to one side, there may be a risk of damage to the magnet during manufacture. Accordingly, the plurality of magnets spaced apart from each other in a longitudinal direction may be disposed in a set to improve reliability during manufacture.

One surface of the first magnet 311 (e.g., a surface facing the first coil 313) may be magnetized to have both N and S poles. For example, on one surface of the first magnet 311 facing the first coil 313, the N pole, a neutral region, and the S pole may be sequentially provided in the first axis (X-axis) direction. The first magnet 311 has a shape having a length in the second axis (Y-axis) direction.

The other surface (e.g., an opposite surface of one surface) of the first magnet 311 may be magnetized to have both S and N poles. For example, the S pole, the neutral region, and the N pole may be sequentially provided on the other surface of the first magnet 311 in the first axis (X-axis) direction.

Magnetization directions of polarities of the plurality of magnets included in the first magnet 311 may all be identical to each other.

The first coil 313 is disposed to face the first magnet 311. For example, the first coil 313 may be disposed to face the first magnet 311 in the optical axis (Z-axis) direction.

The first coil 313 has a donut shape having a hollow, and has a length in the second axis (Y-axis) direction. The first coil 313 includes a smaller number of coils than the number of magnets included in the first magnet 311. For example, the first coil 313 may include two coils spaced apart from each other in a direction in which the driving force is generated (i.e., the first axis (X-axis) direction), and each of the coils may be disposed to face the magnets of the first magnet 311.

The second sub driver 320 includes a second magnet 321 and a second coil 323. The second magnet 321 and the second coil 323 may be disposed to face each other in the optical axis (Z-axis) direction.

The second magnet 321 may include a plurality of magnets. For example, the second magnet 321 may include two magnets, and the two magnets may be spaced apart from each other in the first axis (X-axis) direction. For example, the second magnet 321 may include two magnets spaced apart from each other in a direction perpendicular to the direction in which the driving force is generated by the second magnet 321 (i.e., the second axis (Y-axis) direction).

One surface of the second magnet 321 (e.g., a surface facing the second coil 323) may be magnetized to have both S and N poles. For example, one surface of the second magnet 321 facing the second coil 323 may be provided with the S pole, a neutral region, and the N pole sequentially in the second axis (Y-axis) direction. The second magnet 321 has a shape having a length in the first axis (X-axis) direction.

The other surface (e.g., an opposite surface of one surface) of the second magnet 321 may be magnetized to have both N and S poles. For example, the N pole, a neutral region, and the S pole may be sequentially provided on the other surface of the second magnet 321 in the second axis (Y-axis) direction.

The two magnets of the second magnet 321 may have magnetization directions opposite to each other. The second coil 323 is disposed to face the second magnet 321. For example, the second coil 323 may be disposed to face the second magnet 321 in the optical axis (Z-axis) direction.

The second coil 323 has a donut shape having a hollow and a shape having a length in the first axis (X-axis) direction. The second coil 323 includes a number of coils corresponding to the number of magnets included in the second magnet 321.

Figure 10:
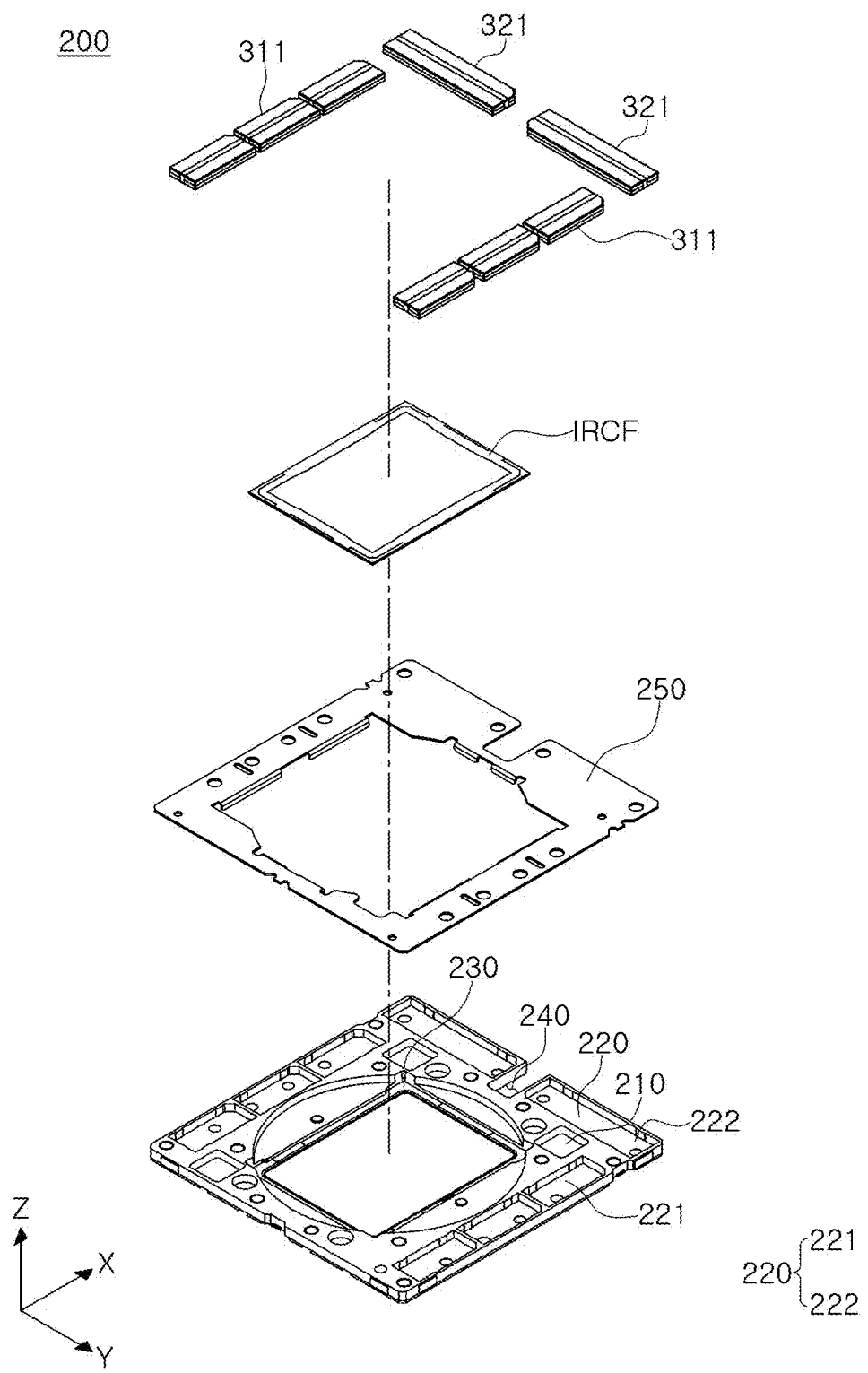
FIG. 10 is an exploded perspective view of a movable frame of the first actuator.

FIG. 10 is an exploded perspective view of the movable frame 200 of the first actuator 10.

Referring to FIG. 10, the first magnet 311 and the second magnet 321 are moving members mounted in the movable frame 200 to move with the movable frame 200, and the first coil 313 and the second coil 323 are fixing members fixed to the fixed frame 100. When the power is applied to the first coil 313, the movable frame 200 may be moved in the first axis (X-axis) direction by electromagnetic force between the first magnet 311 and the first coil 313. Furthermore, when the power is applied to the second coil 323, the movable frame 200 may be moved by the electromagnetic force between the second magnet 321 and the second coil 323 in the second axis (Y-axis) direction. Accordingly, the first magnet 311 and the first coil 313 may generate the driving force in a direction (e.g., the first axis (X-axis) direction) perpendicular to a direction in which the first magnet 311 and the first coil 313 face each other (e.g., an optical axis direction), and the second magnet 321 and the second coil 323 may generate the driving force in a direction (e.g., the second axis (Y-axis) direction) perpendicular to a direction in which the second magnet 321 and the second coil 323 face each other (e.g., an optical axis (Z-axis) direction).

The movable frame 200 may be rotated by the first sub driver 310 and the second sub driver 320. For example, the driving force of the first sub driver 310 and the driving force of the second sub driver 320 may be controlled to generate rotational force, thereby rotating the movable frame 200.

The first magnet 311 and the second magnet 321 are disposed perpendicular to each other in a plane perpendicular to the optical axis (Z-axis), and the first coil 313 and the second coil 323 are also disposed perpendicular to each other in a plane perpendicular to the optical axis (Z-axis).

Referring to FIGS. 9 and 10, the first actuator 10 may sense a position of the movable frame 200 in the direction perpendicular to the optical axis (Z-axis). To this end, the first position sensor 315 and the second position sensor 325 are provided. The first position sensor 315 is disposed in the fixed frame 100 to face the first magnet 311, and the second position sensor 325 is disposed in the fixed frame 100 to face the second magnet 321. The first position sensor 315 and the second position sensor 325 may be hall sensors.

The second position sensor 325 may include two hall sensors. For example, the second magnet 321 includes two magnets spaced apart from each other in the direction perpendicular to the direction in which the driving force is generated by the second magnet 321 (e.g., the second axis (Y-axis) direction), and the second position sensor 325 includes two hole sensors arranged to face the two magnets. Whether the movable frame 200 is rotated may be sensed through the two hall sensors facing the second magnet 321.

Referring to FIGS. 5 and 10, at least one of the surfaces on which the fixed frame 100 and the movable frame 200 face each other in the optical axis (Z-axis) direction is provided with a guide groove in which the first ball member B1 is disposed. The plurality of guide grooves are provided to correspond to the plurality of balls of the first ball member B1. For example, referring to FIG. 5, the first guide groove 170 may be provided on the lower surface of the fixed frame 100, and, referring to FIG. 10, the second guide groove 210 may be provided on the upper surface of the movable frame 200. The first ball member B1 is disposed in the first guide groove 170 and the second guide groove 210 and is inserted between the fixed frame 100 and the movable frame 200.

The first guide groove 170 and the second guide groove 210 may have a polygonal or circular planar shape, respectively. The sizes of the first guide groove 170 and the second guide groove 210 are larger than a diameter of the first ball member B1. For example, on a plane perpendicular to the optical axis (Z-axis), the cross-sections of the first guide groove 170 and the second guide groove 210 may have a size larger than the diameter of the first ball member (B1). As long as the sizes of the first guide groove 170 and the second guide groove 210 are larger than the diameter of the first ball member B1, specific shapes thereof are not limited. Accordingly, the first ball member B1 may be rolled in the direction perpendicular to the optical axis (Z-axis) while being accommodated in the first guide groove 170 and the second guide groove 210.

Hereinafter, with reference to FIG. 10, the movable frame 200 will be described.

The first magnet 311 and the second magnet 321 are mounted in the movable frame 200. The movable frame 200 includes a magnet accommodating portion 220 in which the first magnet 311 and the second magnet 321 are mounted. The magnet accommodating portion 220 may include a first magnet accommodating portion 221 in which the first magnet 311 is mounted and a second magnet accommodating portion 222 in which the second magnet 321 is mounted.

An infrared blocking filter IRCF may be mounted in the movable frame 200. In the instant case, a distance in one direction from the infrared blocking filter (IRCF) to one side of the movable frame 200 may be different from a distance in the other direction from the infrared blocking filter (IRCF) to the other side of the movable frame 200. Here, one side surface and the other side surface of the movable frame 200 may refer to surfaces disposed on opposite sides, and one direction and the other direction may refer to opposite directions. For example, a distance in a +Y-axis direction from the infrared blocking filter (IRCF) to one side of the movable frame 200 may be shorter than a distance in a −Y-axis direction from the infrared blocking filter (IRCF) to the other side of the movable frame 200.

A filter mounting groove 230 in which an infrared blocking filter IRCF is mounted may be provided on the upper surface of the movable frame 200.

On the other hand, because the movable frame 200 is accommodated in the fixed frame 100, a thickness of the movable frame 200 requires to be reduced to reduce a height of the first actuator 10 in the optical axis (Z-axis). However, when the thickness of the movable frame 200 is reduced, the rigidity of the movable frame 200 may be weakened, and reliability against external impacts may be reduced. Accordingly, a reinforcing plate 250 may be provided in the movable frame 200 to reinforce the rigidity of the movable frame 200.

The reinforcing plate 250 may be disposed inside the movable frame 200. The reinforcing plate 250 may be formed of stainless steel. The reinforcing plate 250 may be provided for rigidity reinforcement of the movable frame 200. The reinforcing plate 250 may be integrally coupled to the movable frame 200 by the insert injection. In the instant case, the reinforcing plate 250 may be manufactured to be integrated with the movable frame 200 by injecting a resin material into a mold in a state in which the reinforcing plate 250 is fixed in the mold.

A portion of the reinforcing plate 250 may be disposed to be exposed outside the movable frame 200. In this manner, the reinforcement plate 250 may be integrally formed inside the movable frame 200, while exposing a portion of the reinforcement plate 250 outside the movable frame 200, thereby improve coupling force of the reinforcement plate 250 as well as preventing the reinforcement plate 250 from being separated from the movable frame 200.

A protrusion 240 protruding to the sensor substrate 400 may be disposed in the movable frame 200. For example, the protrusion 240 may be disposed on the lower surface of the movable frame 200, and the protrusion 240 may be coupled to the moving portion 410 of the sensor substrate 400 described below (see FIG. 3). Accordingly, a gap may be formed in the optical axis (Z-axis) direction between a main body of the movable frame 200 and the sensor substrate 400, thereby preventing interference with the sensor substrate 400 when the movable frame 200 moves on an X-Y plane. In FIG. 10, the protrusion 240 may be disposed on a lower surface of the mobile frame 200, but this is only an example, and the protrusion 240 may be disposed on an upper surface of the sensor substrate 400.

Figure 11:
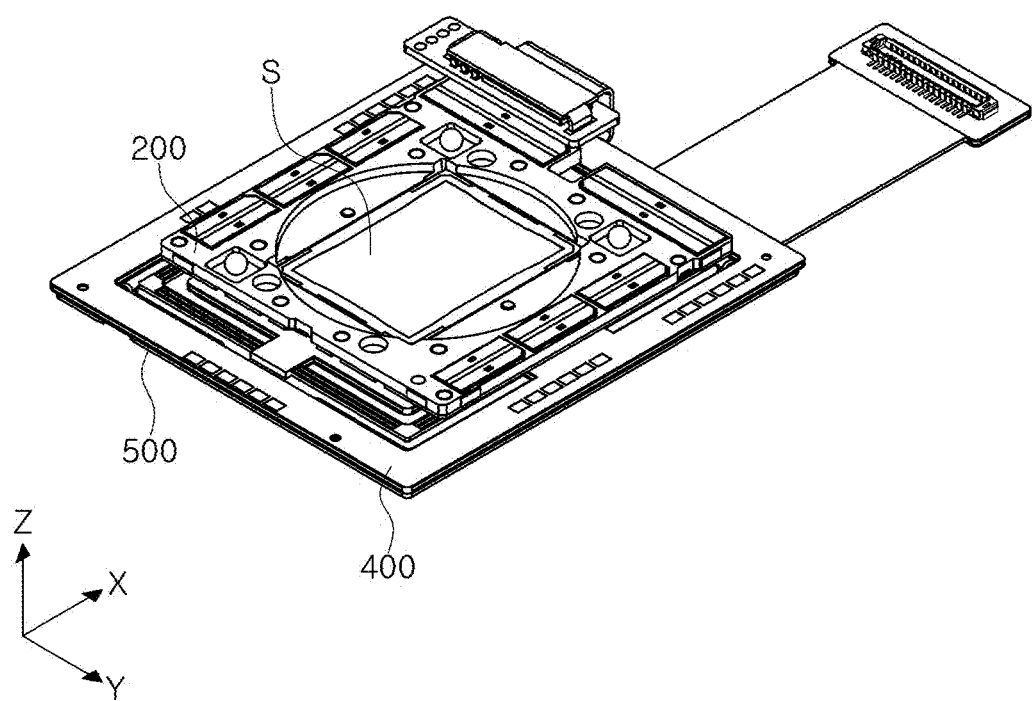
FIG. 11 is a perspective view of the movable frame, a sensor substrate, and a base of the first actuator.
Figure 12:
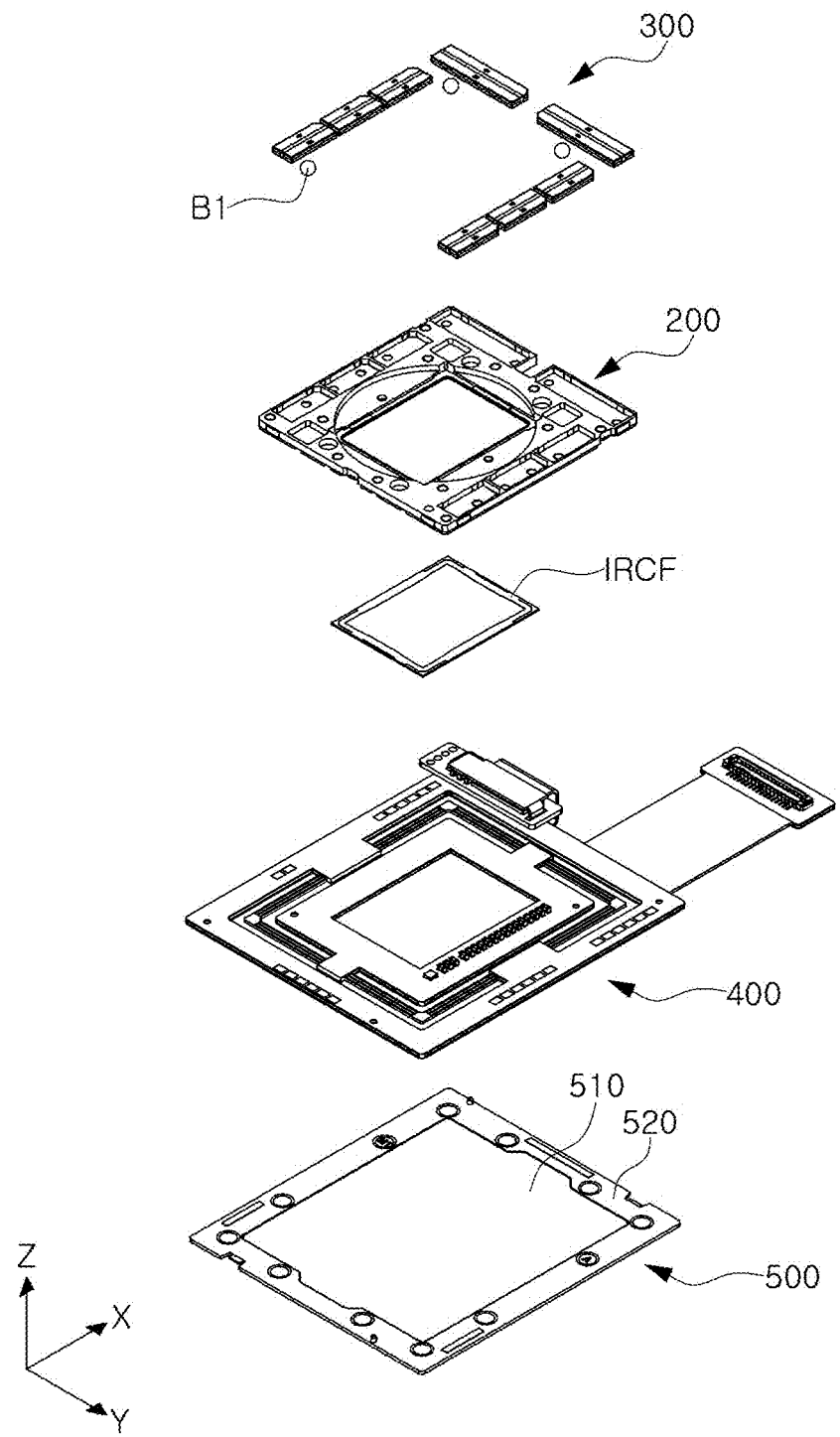
FIG. 12 is an exploded perspective view of FIG. 11.

FIG. 11 is a perspective view of the movable frame 200, the sensor substrate 400, and the base 500 of the first actuator 10, and FIG. 12 is an exploded perspective view of FIG. 11.

Referring to FIGS. 11 and 12, the sensor substrate 400 is disposed on the lower surface of the mobile frame 200, and the base 500 is disposed on a lower surface of the sensor substrate 400. The image sensor S mounted in the sensor substrate 400 moves with the movable frame 200 in a direction (e.g., the X-axis or Y-axis) perpendicular to the optical axis (Z-axis). In the instant case, the movement of the movable frame 200 is performed by the first driver 300 described above. For example, when the driving force is generated in the first axis (X-axis), the movable frame 200 moves in the first axis (X-axis) direction, and a portion of the sensor substrate 400 coupled to the movable frame 200 also moves in the first axis (X-axis) direction. Furthermore, when the driving force is generated in the second axis (Y-axis) direction, the movable frame 200 moves in the second axis (Y-axis) direction, and a portion of the sensor substrate 400 coupled to the movable frame 200 also moves in the second axis (Y-axis) direction. Furthermore, when the movable frame 200 is rotated by generating a deviation between the magnitude of the driving force in the first axis (X-axis) and the magnitude of the driving force in the second axis (Y-axis), a portion of the sensor substrate 400 coupled to the movable frame 200 also rotates.

Figure 13:
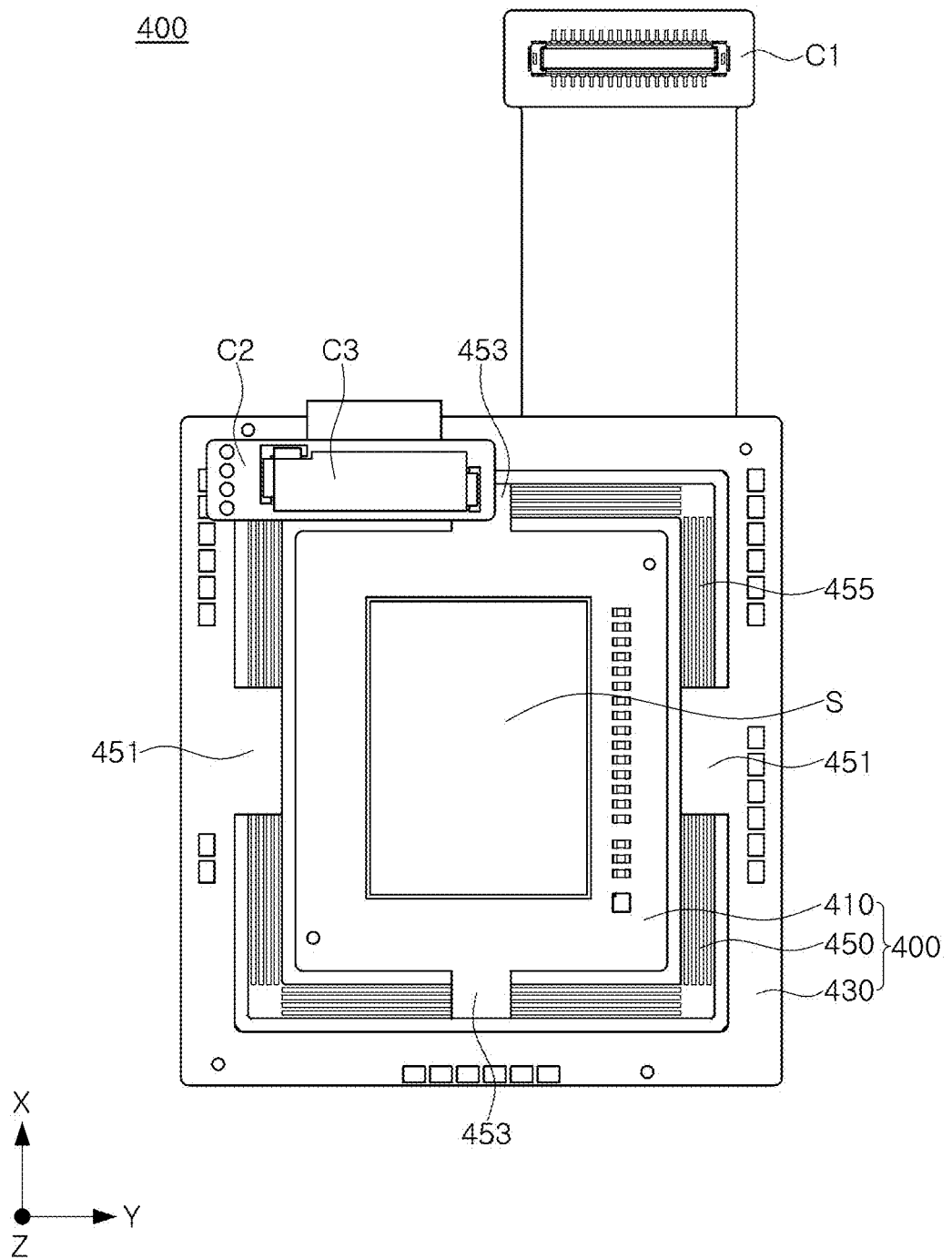
FIG. 13 is a plan view of the sensor substrate of the first actuator.

FIG. 13 is a plan view of the sensor substrate 400 of the first actuator 10. Referring to FIG. 13, the configuration of the sensor substrate 400 will be described below.

Referring to FIG. 13, the sensor substrate 400 includes the moving portion 410, the fixing portion 430, and a connection portion 450. The sensor substrate 400 may be an RF PCB.

The image sensor S is mounted in the moving portion 410. The moving portion 410 is coupled to the lower surface of the movable frame 200. For example, an area of the moving portion 410 is larger than an area of the image sensor S, and the moving portion 410 of an external portion of the image sensor S may be coupled to the lower surface of the movable frame 200. The moving portion 410 is a moving member that moves with the movable frame 200 during the optical image stabilization. The moving portion 410 may be a rigid circuit board (Rigid PCB).

The fixing portion 430 is coupled to the lower surface of the fixed frame 100. The fixing portion 430 is a fixing member that does not move during the optical image stabilization. The fixing portion 430 may be a rigid circuit board (Rigid PCB).

The connection portion 450 is disposed between the moving portion 410 and the fixing portion 430, and may connect the moving portion 410 and the fixing portion 430. The connection unit may be a flexible circuit board (Flexible PCB). When the moving portion 410 moves, the connection portion 450 disposed between the moving portion 410 and the fixing portion 430 may be bent.

The connection portion 450 extends along a circumference of the moving portion 410. The connection portion 450 is provided with a plurality of slits penetrating through the connection portion 450 in the optical axis (Z-axis) direction. The plurality of slits are disposed at intervals between the moving portion 410 and the fixing portion 430. Accordingly, the connection portion 450 may include a plurality of bridge elements 455 spaced apart from each other by the plurality of slits. The plurality of bridge elements 455 extend along the circumference of the moving portion 410.

The connection portion 450 includes a first support 451 and a second support 453. The connection portion 450 is connected to the fixing portion 430 through the first support 451. Furthermore, the connection portion 450 is connected to the moving portion 410 through the second support 453. The first support 451 is in contact with the fixing portion 430 and is spaced apart from the moving portion 410. Furthermore, the second support 453 is in contact with the moving portion 410 and is spaced apart from the fixing portion 430.

For example, the first support 451 may extend in the first axis (X-axis) direction to connect the plurality of bridge elements 455 of the connection portion 450 and the fixing portion 430. In an example configuration, the first support 451 may include two supports disposed opposite to each other in the first axis (X-axis) direction.

Furthermore, the second support 453 may extend in the second axis (Y-axis) direction to connect the bridge elements 455 of the connection portion 450 and the moving portion 410. In an example embodiment, the second support 453 may include two supports disposed opposite to each other in the second axis (Y-axis) direction.

Accordingly, the moving portion 410 may move in the direction perpendicular to the optical axis (Z-axis) or rotate based on the optical axis (Z-axis) in a state in which the moving portion 410 is supported by the connection portion 450.

In an example configuration, when the image sensor S moves in the first axis (X-axis) direction, the plurality of bridge elements 455 connected to the first support 451 may be bent. Furthermore, when the image sensor S rotates, the plurality of bridge elements 455 connected to the first support 451 and the plurality of bridge elements 455 connected to the second support 453 may be bent together.

In an example configuration, a length of the fixing portion 430 in the first axis (X-axis) direction may be different from a length thereof in the second axis (Y-axis) direction. For example, the length of the fixing portion 430 in the second axis (Y-axis) direction may be shorter than the length thereof in the first axis (X-axis) direction. In an example configuration, the sensor substrate 400 may have a rectangular shape on a whole.

In the sensor substrate 400, when a length of the first support 451 is equal to a length of the second support 453, a load on the plurality of bridge elements 455 connected to the first support 451 may be different from a load on the plurality of bridge elements 455 connected to the second support 453, which may make it difficult to control operations thereof.

Accordingly, by making the length of the first support 451 different from the length of the second support 453, the length of the plurality of bridge elements 455 extending from the first support 451 in the first axis (X-axis) direction may be approximately equal to the length of the plurality of bridge elements 455 extending from the second support 453 in the second axis (Y-axis) direction.

Here, the length of the first support 451 may refer to a length in the first axis (X-axis) direction, and the length of the second support 453 may refer to a length in the second axis (Y-axis) direction.

A driver IC C3 for driving control of the first driver 300 may be disposed in the sensor substrate 400. The driver IC C3 may be disposed on a connection board C2, and the connection board C2 may be connected to the fixing portion 430 by the flexible circuit board (Flexible PCB).

The driver IC C3 may be fixed to an upper surface of the fixed frame 100 (e.g., an upper surface of the shield can 100a). That is, because the flexible circuit board may be bent, the connection board C2 in which the driver IC C3 is disposed may be disposed on the upper surface of the fixed frame 100. Accordingly, because it is not required to secure a separate installation space, an overall size of the camera module 1 may be reduced.

Furthermore, a first connector C1 to be connected to an external power source (e.g., a portable electronic device equipped with the camera module 1) may be extended and disposed in the fixing portion 430 of the sensor substrate 400.

Figure 14:
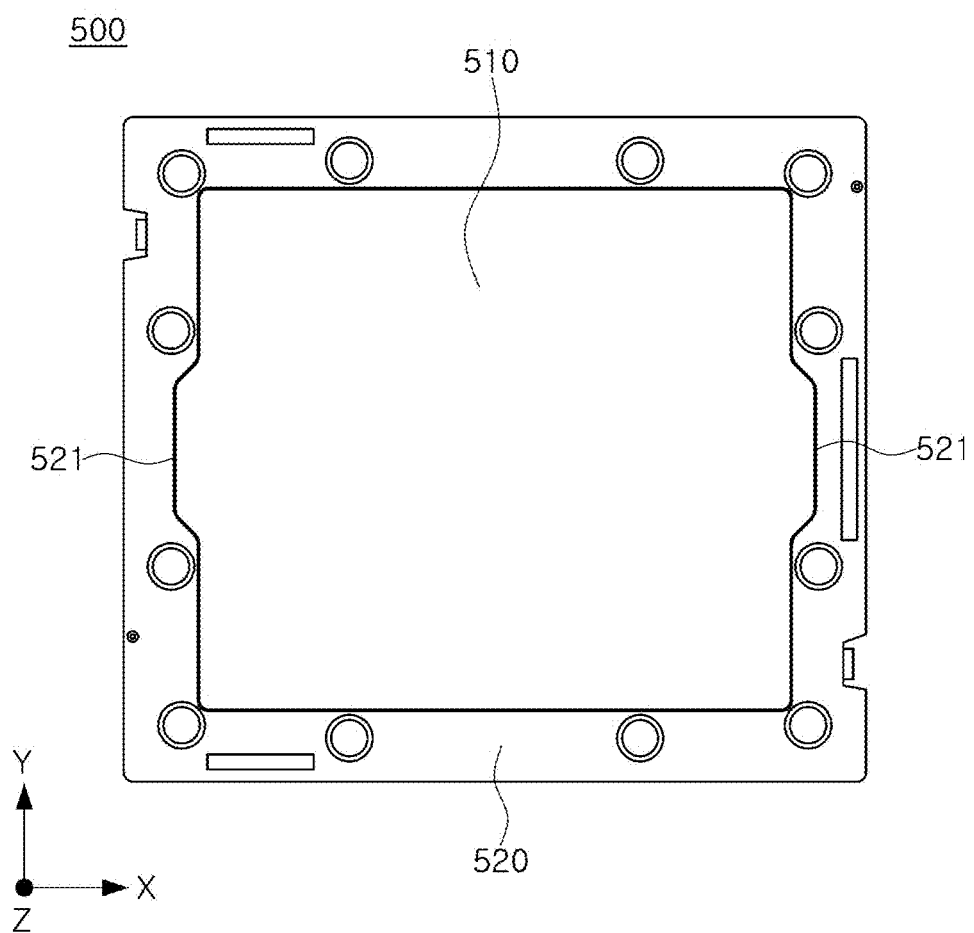
FIG. 14 is a plan view of a base of the first actuator.

FIG. 14 is a plan view of the base 500 of the first actuator 10. Referring to FIGS. 11, 12 and 14, the base 500 will be described.

The base 500 may be disposed on the lower surface of the sensor substrate 400. The base 500 may include the first plate 510 and the second plate 520 facing the image sensor S. In the instant case, the first plate 510 may be insert-injected from the base 500, and the second plate 520 may surround an external periphery of the first plate 510.

The first plate 510 and the second plate 520 may be formed of different materials. The first plate 510 may be formed of a material having higher thermal conductivity than that of the second plate 520. For example, the first plate 510 may be formed of stainless steel, and the second plate may be formed of a plastic material.

According to an example, the movable frame 200 relatively moves with respect to the fixed frame 100, and the movable frame 200 collides with the fixed frame 100, which may cause an impact therewith. In the instant case, the second support 453 of the sensor substrate 400 moves together when the movable frame 200 moves in the first axis (X-axis) direction. When the second support 453 moves in the first axis (X-axis) direction, the second support 453 may collide with the second plate 520 of the base 500 due to the amount of an impact between the movable frame 200 and the fixed frame 100 or shaking of the movable frame 200 itself.

Accordingly, the base 500 may include an avoidance groove 521 indented into the second plate 520 so as to prevent the collision between the second support 453 and the second plate 520. A plurality of avoidance grooves 521 may be provided at positions corresponding to the second support 453 of the sensor substrate 400.

Figure 15:
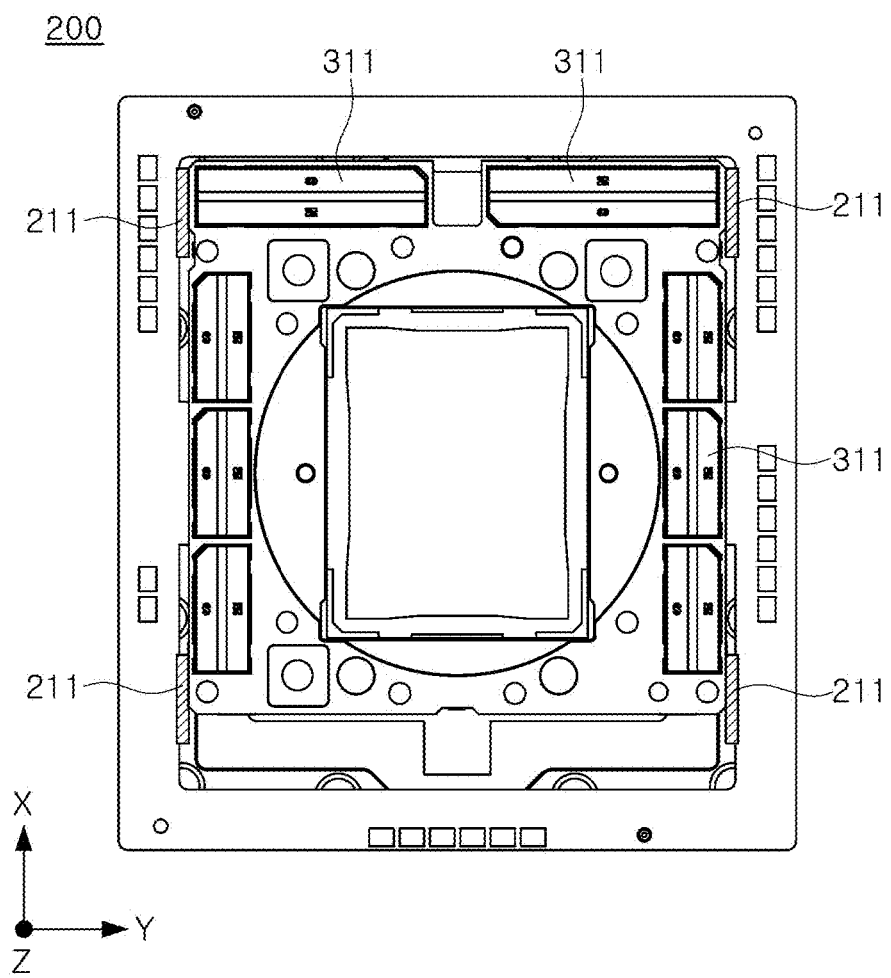
FIG. 15 is a partial plan view of the movable frame and the sensor substrate of the first actuator, in which a buffer member is illustrated.

FIG. 15 is a partial plan view of the movable frame 200 and the sensor substrate 400 of the first actuator 10 in which a buffer member 211 is illustrated.

As described above, according to an example configuration, the movable frame 200 relatively moves with respect to the fixed frame 100, and the movable frame 200 collides with the fixed frame 100, which may cause an impact therewith. When there is a larger amount of impacts due to the collision between the movable frame 200 and the fixed frame 100, the movable frame 200 or the fixed frame 100 may be detached.

In order to prevent this, the buffer member 211 may be disposed on a side surface of the movable frame 200 or on an internal side of the fixed frame 100 facing the side surface of the movable frame 200. The buffer member 211 serves to absorb the impact amount generated when the movable frame 200 moves with respect to the fixed frame 100. For example, referring to FIG. 15, a plurality of buffer members 211 are disposed on the external surface of the movable frame 200, thus absorbing the impact amount between the fixed frame 100 and the movable frame 200. However, the present disclosure is not limited thereto, and the buffer member may be formed on an internal surface of the fixed frame 100.

Figure 16:
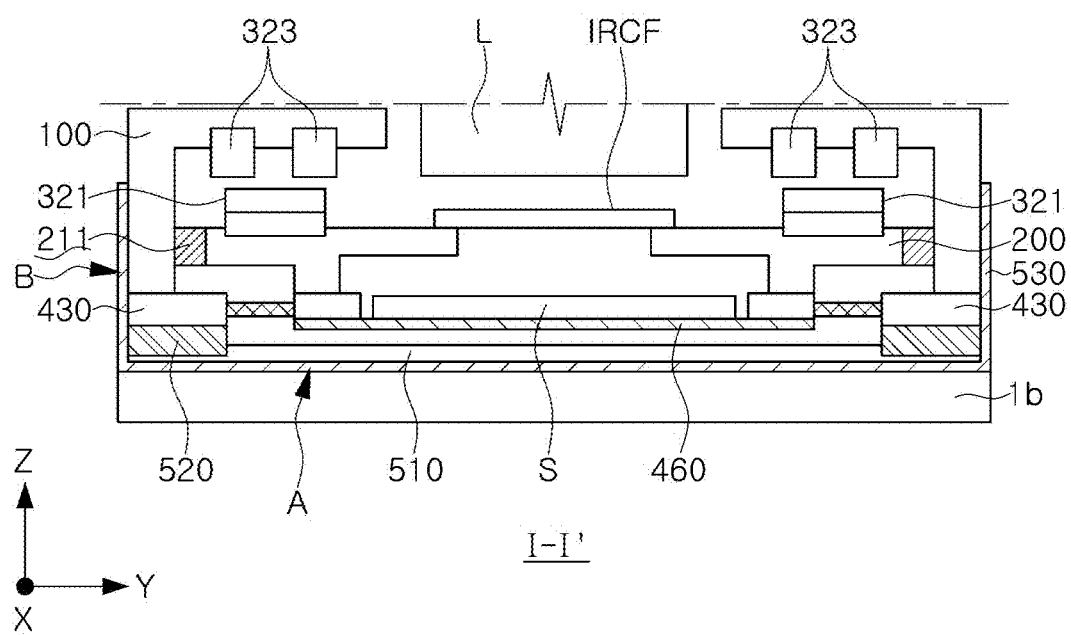
FIG. 16 is a schematic cross-sectional view of direction I-I' of FIG. 1.

FIG. 16 is a schematic cross-sectional view of direction I-I' of FIG. 1. Referring to FIG. 16, thermal radiation of the camera module 1 will be described.

A heat transmission member 460 may be disposed in a lower end of the image sensor S. The heat transmission member 460 may be in contact with the moving portion 410 of the sensor substrate 400. That is, the heat transmission member 460 may be disposed in the lower ends of the image sensor S and the moving portion 410 of the sensor substrate 400. The heat transmission member 460 may be arranged to effectively radiate heat generated by the image sensor S.

The first plate 510 of the base 500 may be spaced apart from a lower end of the heat transmission member 460. That is, the first plate 510 may be disposed to face the moving portion 410 and the connection portion 450 of the sensor substrate 400. The second plate 520 of the base 500 may be disposed in a lower end of the fixing portion 430 to be disposed to come into contact with the fixing portion 430 of the sensor substrate 400.

The heat transmission member 460 and the first plate 510 may be formed of a material having high thermal conductivity. For example, as described above, the first plate 510 may be formed of stainless steel as described above, and the heat transmission member 460 may also be formed of the same material.

The heat dissipation film 530 may be disposed on the lower portion of the base 500. The heat dissipation film 530 may be formed of a graphite material having excellent thermal conductivity.

As the heat dissipation film 530 is disposed on a lower surface of the 146 base 500, thermal conductivity to a set component 1b may be improved. Furthermore, the heat dissipation film 530 may cover the lower portion of the base 500 and a portion of the side surface of the first actuator 10. For example, the heat dissipation film 530 may cover the lower surface of the base 500, and may further cover at least one of a side surface of the sensor substrate 400 and a side surface of the fixed frame 100 if necessary. In the instant case, heat radiation may be performed according to an area of the heat dissipation film 530 covering the side surface of the sensor substrate 400 or the side surface of the fixed frame 100. Accordingly, the heat generated by the image sensor S may be effectively radiated.

In summary, the heat generated by the image sensor S is transmitted to the heat transmission member 460 through conduction, and is transmitted to the base 500 including the first plate 510 facing the heat transmission member 460 through radiation and convection. The heat absorbed by the first plate 510 is transmitted to the heat dissipation film 530 in contact with the first plate 510 through the conduction. The heat absorbed by the heat dissipation film 530 may be transmitted (A) to the set component 1b through the conduction or may be radiated (B) externally.

Figure 17:
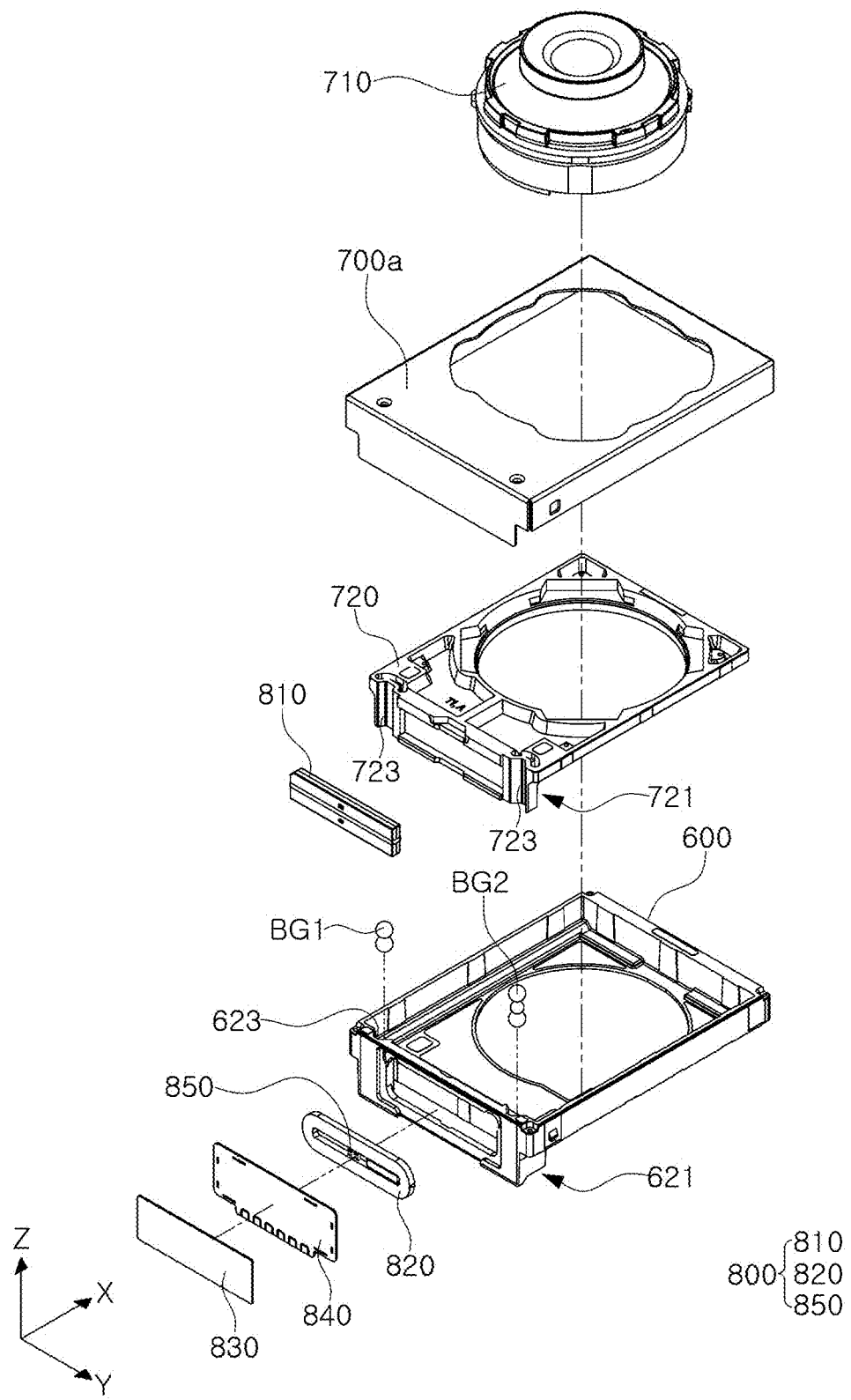
FIG. 17 is an exploded perspective view of a second actuator.
Figure 18:
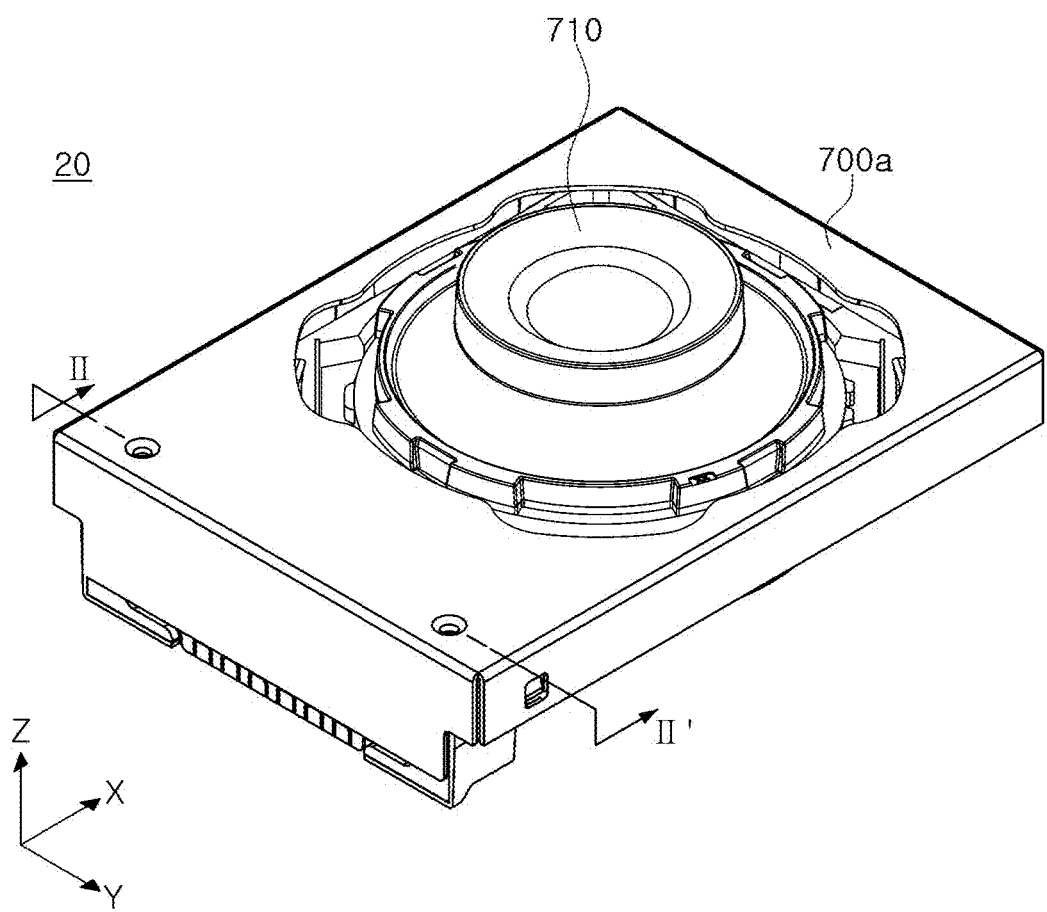
FIG. 18 is a perspective view of the second actuator.
Figure 19:
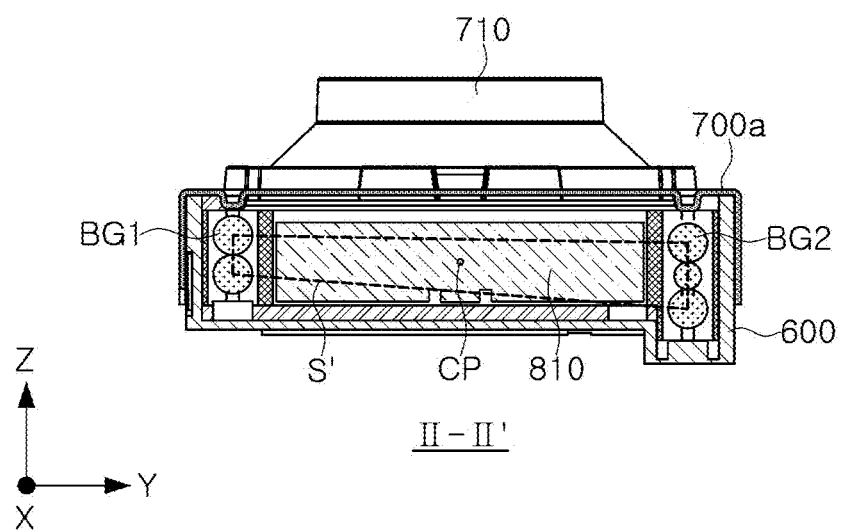
FIG. 19 is a cross-sectional view taken along line II-II' of FIG. 18.

FIG. 17 is an exploded perspective view of the second actuator 20. FIG. 18 is a perspective view of the second actuator 20. FIG. 19 is a cross-sectional view taken along line II-II' of FIG. 18. Referring to FIGS. 17 to 19, the second actuator 20 will be described below.

Referring to FIG. 17, the second actuator 20 includes the carrier 720, the housing 600, and the second driver 800, and may further include a case 700a.

The carrier 720 may be equipped with a hollow portion that penetrates through the carrier 720 in the optical axis (Z-axis), and the lens barrel 710 is inserted into the hollow portion and fixed to the carrier (720). Accordingly, the lens barrel 710 and the carrier 720 may move together in the optical axis (Z-axis) direction.

The housing 600 may have an internal space and may have a rectangular box shape in which an upper portion and a lower portion thereof are open. The carrier 720 is disposed in the internal space of the housing 600.

The second driver 800 may generate driving force in the optical axis (Z-axis) direction to move the carrier 720 in the optical axis (Z-axis) direction. The second driver 800 includes a third magnet 810 and a third coil 820. The third magnet 810 and the third coil 820 may be disposed to face each other in the direction perpendicular to the optical axis (Z-axis).

The third magnet 810 is disposed in the carrier 720. For example, the third magnet 810 may be disposed on one side of the carrier 720.

The second actuator 20 may sense a position of the carrier 720 in the optical axis (Z-axis) direction. To this end, a third position sensor 850 is provided. The third position sensor 850 is disposed in the substrate 840 to face the third magnet 810. The third position sensor 850 may be a hall sensor.

One side surface of the carrier 720 may have a shape protruding more in the optical axis (Z-axis) direction than other portions of the carrier 720. For example, the carrier 720 may include a first guide portion 721 protruding in an optical axis (Z-axis) direction, and the third magnet 810 may be disposed in the first guide portion 721. Accordingly, a height of the second actuator 20 may be configured to be slim by reducing the height of the other portions of the carrier 720 while securing an installation space of the second driver 800 by securing the driving force.

A back yoke (not illustrated) may be disposed between the carrier 720 and the third magnet 810. The back yoke (not illustrated) may improve the driving force by preventing a magnetic flux of the third magnet 810 from leaking.

The third magnet 810 may be magnetized so that one surface thereof (e.g., a surface facing the third coil 820) has both N and S poles. For example, one surface of the third magnet 810 facing the third coil 820 may be provided with the N pole, a neutral region, and the S pole sequentially in the optical axis (Z-axis) direction.

The other surface (e.g., an opposite surface of one surface) of the third magnet 810 may be magnetized to have both S and N poles. For example, the S pole, a neutral region, and the N pole may be sequentially provided on the other surface of the third magnet 810 in the optical axis (Z-axis) direction.

The third coil 820 is disposed to face the third magnet 810. For example, the third coil 820 may be disposed to face the third magnet 810 in the direction perpendicular to the optical axis (Z-axis). Furthermore, the third coil 820 is disposed in the substrate 840, and the substrate 840 is mounted in the housing 600 so that the third magnet 810 and the third coil 820 face each other in the direction perpendicular to the optical axis (Z-axis).

One side surface of the housing 600 may have a shape protruding more in the optical axis (Z-axis) direction than other portions of the housing 600. For example, the housing 600 may include a second guide portion 621 protruding in the optical axis (Z-axis) direction, and the substrate 840 may be mounted in the second guide portion 621. The second guide portion 621 has an accommodation space for accommodating the first guide portion 721. Accordingly, the height of the second actuator 20 may be configured to be slim by reducing the height of other portions of the housing 600 while securing the installation space of the second driver 800 to secure the driving force.

The third magnet 810 is a moving member mounted in the carrier 720 and moving with the carrier 720 in the optical axis (Z-axis) direction, and the third coil 820 is a fixing member fixed to the substrate 840.

When the power is applied to the third coil 820, the carrier 720 may be moved in the optical axis (Z-axis) direction by electromagnetic force between the third magnet 810 and the third coil 820. Because the lens barrel 710 is disposed in the carrier 720, the lens barrel 710 also moves in the optical axis (Z-axis) direction by the movement of the carrier 720.

Second ball members BG1 and BG2 are disposed between the carrier 720 and the housing 600. For example, the second ball members BG1 and BG2 may be disposed between the first guide portion 721 of the carrier 720 and the second guide portion 621 of the housing 600. The second ball members BG1 and BG2 include a plurality of balls disposed in the optical axis (Z-axis) direction. The plurality of balls may be rolled in the optical axis (Z-axis) direction when the carrier 720 moves in the optical axis (Z-axis) direction.

A yoke 830 is disposed in the housing 600. The yoke 830 may be disposed in a position facing the third magnet 810. For example, the third coil 820 may be disposed on one surface of the substrate 840, and the yoke 830 may be disposed on the other surface of the substrate 840.

The third magnet 810 and the yoke 830 may generate attractive force to each other. For example, the attractive force is exerted between the third magnet 810 and the yoke 830 in the direction perpendicular to the optical axis (Z-axis).

Due to the attractive force between the third magnet 810 and the yoke 830, the second ball member (B2) may be in contact with the carrier 720 and the housing 600, respectively.

Guide grooves may be disposed on surfaces on which the carrier 720 and the housing 600 face each other. For example, the first guide portion 721 of the carrier 720 may be provided with a third guide groove 723, and the second guide portion 621 of the housing 600 may be provided with a fourth guide groove 623.

The third guide groove 723 and the fourth guide groove 623 extend in the optical axis (Z-axis) direction. The second ball member B2 is disposed between the third guide groove 723 and the fourth guide groove 623.

Because the first guide portion 721 of the carrier 720 and the second guide portion 621 of the housing 600 protrude in the optical axis (Z-axis) direction, avoidance regions may be provided in the fixed frame 100 and the movable frame 200 of the first actuator 10 so as to secure the installation space for the first guide portion 721.

In other words, as described in FIG. 2, one side of the fixed frame 100 is provided with a step portion 113, and as described in FIG. 11, one side of the mobile frame 200 is formed shorter than the other side of the movable frame 200 to expose a portion of the sensor substrate 400, thereby securing the installation space of the first guide portion 721 and the second guide portion 621.

Accordingly, even if the first guide portion 721 of the carrier 720 and the second guide portion 621 of the housing 600 protrude in the second actuator 20 in the optical axis (Z-axis) direction, because the protruding portion is disposed in the first actuator 10, the height of the entire camera module 1 may not increase.

In order for the carrier 720 to move in parallel with the optical axis (i.e., prevent occurrence of a tilt) when the carrier 720 moves in the optical axis (Z-axis) direction, a center point CP of action of the attractive force exerted between the third magnet 810 and the yoke 830 has to be disposed inside a support region S' generated by connecting contact points of the second ball members BG1 and BG2 and the carrier 720 or the housing 600.

If the center point CP of action of the attractive force deviates from the support region S', a position of the carrier 720 may be twisted during the movement of the carrier 720, which may cause a tilt. Accordingly, the support region S' is required to be formed to be as wide as possible.

Referring to FIG. 18, because two balls of the first ball group BG1 have the same diameter, the first ball group BG1 is in two-point contact with the carrier 730 or the housing 600. Furthermore, because diameters of two of the three balls of the second ball group BG2 are larger than a diameter of the other ball, the second ball group BG2 is in two-point contact with the carrier 720 or housing 600.

Accordingly, the second ball member including the first ball group BG1 and the second ball group BG2 is in four-point contact with the carrier 720 or the housing 600. Furthermore, the support region S' in which the contact points are connected to each other may have a rectangular shape (e.g., a trapezoidal shape).

Accordingly, the support region S' may be formed relatively wide, and accordingly, the center point CP of action of the attractive force exerted between the third magnet 810 and the third yoke 830 may be stably disposed inside the support region S'. Therefore, driving stability may be secured during focus adjustment.

The camera module 1 is configured to move the lens module 700 in the optical axis (Z-axis) direction during automatic focus adjustment, and to move the image sensor S in the direction perpendicular to the optical axis (Z-axis) during the optical image stabilization.

Accordingly, even if the lens module 700 moves in the optical axis (Z-axis) direction during the focus adjustment, because relative positions of the magnets and the coils of the first driver 300 are not changed, the driving force for the optical image stabilization may be precisely controlled.

Furthermore, even if the image sensor S moves in the direction perpendicular to the optical axis (Z-axis) during the optical image stabilization, because relative positions of the magnet and the coil of the second driver 800 are not changed, the driving force for focus adjustment may be precisely controlled.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical image stabilization comprising:
a fixed frame defining an internal space;
a movable frame accommodated in the fixed frame and configured to be movable relative to the fixed frame;
a first driver configured to provide driving force to the movable frame;
a sensor substrate including a moving portion coupled to the movable frame, wherein the moving portion is configured to move with the movable frame;
an image sensor disposed in the sensor substrate and including an imaging surface oriented toward a first direction; and
a base spaced apart from the image sensor,
wherein the base includes a first plate facing the image sensor and a second plate surrounding an external periphery of the first plate,
wherein the image sensor is disposed on the moving portion of the sensor substrate and the sensor substrate comprises:
a fixing portion coupled to the fixed frame; and
a connection portion connecting the moving portion to the fixing portion,
wherein the connection portion includes a first support and a second support,
wherein a first side of the first support is connected to the fixing portion and a second side of the first support is spaced apart from the moving portion, and
wherein a first side of the second support is connected to the moving portion and a second side of the second support is spaced apart from the fixing portion.

2. The actuator for optical image stabilization of claim 1, wherein the first plate is formed of a material having a higher thermal conductivity than a thermal conductivity of the second plate.

3. The actuator for optical image stabilization of claim 2, wherein the first plate is formed of stainless steel.

4. The actuator for optical image stabilization of claim 1, wherein the first plate is insert-injected from the base.

5. The actuator for optical image stabilization of claim 1, further comprising:
a heat transmission member disposed between the image sensor and the base.

6. The actuator for optical image stabilization of claim 5, wherein the first plate and the heat transmission member are spaced apart from each other.

7. The actuator for optical image stabilization of claim 1, wherein the connection portion extends along a circumference of the moving portion and includes a plurality of bridge elements spaced apart from each other.

8. The actuator for optical image stabilization of claim 7, wherein the second plate includes an indented avoidance groove indented, and
the avoidance groove is disposed to correspond to the second support.

9. The actuator for optical image stabilization of claim 1, further comprising:
a heat dissipation film disposed on a lower portion of the base.

10. The actuator for optical image stabilization of claim 9, wherein the heat dissipation film covers a lower surface of the base and a side surface of the fixed frame.

11. The actuator for optical image stabilization of claim 9, wherein the heat dissipation film is formed of a graphite material.

12. The actuator for optical image stabilization of claim 1, further comprising:
a buffer member disposed on a side surface of the movable frame or on an internal side surface of the fixed frame facing a side surface of the movable frame and configured to absorb impacts generated when the movable frame moves relative to the fixed frame.

13. A camera module comprising:
a housing defining an internal space;
a lens module accommodated in the internal space and configured to be movable in an optical axis direction;
a fixed frame fixed to the housing;
a movable frame accommodated in the fixed frame and configured to be movable relative to the fixed frame;
a first driver configured to provide driving force to the movable frame;
a sensor substrate including a moving portion coupled to the movable frame, wherein the moving portion is configured to move with the movable frame;
an image sensor disposed on the sensor substrate and including an imaging surface oriented toward a first direction; and
a base spaced apart from the image sensor and disposed to overlap the image sensor in the optical axis direction,
wherein the base includes a first plate formed of a material having a higher thermal conductivity than a thermal conductivity of the base,
wherein the image sensor is disposed on the moving portion of the sensor substrate and the sensor substrate comprises:
a fixing portion coupled to the fixed frame; and
a connection portion connecting the moving portion to the fixing portion,
wherein the connection portion includes a first support and a second support,
wherein a first side of the first support is connected to the fixing portion and a second side of the first support is spaced apart from the moving portion, and
wherein a first side of the second support is connected to the moving portion and a second side of the second support is spaced apart from the fixing portion.

14. The camera module of claim 13, wherein the first driver includes a first sub driver configured to generate driving force in a first axis direction perpendicular to the optical axis direction, and a second sub driver configured to generate driving force in a second axis direction perpendicular to both the optical axis direction and the first axis direction, and
at least one of the first sub driver and the second sub driver includes a plurality of magnets spaced apart from each other in a direction perpendicular to a direction in which the driving force is generated.

15. The camera module of claim 13, further comprising:
a second driver configured to provide driving force to move the lens module relative to the housing in the optical axis direction,
wherein the second driver includes a magnet disposed in the lens module and a coil disposed on the housing.

16. The camera module of claim 1, wherein the first plate and the second plate are formed of different materials.

* * * * *